US011842058B2

(12) United States Patent
Koropoff

(10) Patent No.: US 11,842,058 B2
(45) Date of Patent: Dec. 12, 2023

(54) STORAGE CLUSTER CONFIGURATION

(71) Applicant: EMC IP Holding Company LLC, Hopkinton, MA (US)

(72) Inventor: Brian Koropoff, Bellevue, WA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 120 days.

(21) Appl. No.: 17/491,054

(22) Filed: Sep. 30, 2021

(65) Prior Publication Data

US 2023/0102863 A1 Mar. 30, 2023

(51) Int. Cl.
G06F 16/00 (2019.01)
G06F 3/06 (2006.01)
G06F 16/10 (2019.01)
G06F 16/242 (2019.01)
G06F 16/901 (2019.01)
(Continued)

(52) U.S. Cl.
CPC .......... G06F 3/0632 (2013.01); G06F 3/0604 (2013.01); G06F 3/0673 (2013.01);
(Continued)

(58) Field of Classification Search
CPC .... G06F 16/9024; G06F 16/10; G06F 16/322; G06F 16/13; G06F 16/2246; G06F 16/29;
(Continued)

(56) References Cited

U.S. PATENT DOCUMENTS 6,381,605 B1 * 4/2002 Kothuri ............... G06F 16/2246
707/999.102
9,058,347 B2 * 6/2015 Chandrasekhar ..... G06F 16/322
(Continued)

FOREIGN PATENT DOCUMENTS

WO WO2013029674 A1 * 3/2013
WO WO2013188153 A1 * 12/2013

OTHER PUBLICATIONS

Ajeet Pal Singh Panwar et al., "Hierarchal data storage using NAI indexing", 3rd International Conference on Advances in Computing,Communication & Automation (ICACCA) (Fall), Sep. 2017, pp. 1-7.*

(Continued)

Primary Examiner — Srirama Channavajjala
(74) Attorney, Agent, or Firm — Amin, Turocy & Watson, LLP

(57) ABSTRACT

Storage cluster configuration for computing resources of a storage system is disclosed. A cluster configuration can be based on client indicated cluster criteria. Further, a cluster configuration can be based on non-client indicated criteria, such as, system requirements, regulatory compliance, industry best practices, etc. Determined candidate cluster configurations that can satisfy client criteria can be organized according to a selection preference, to enable selection of a preferred cluster configuration from the candidate cluster configurations. Candidate cluster configurations can result from recursive combinatorial searching, with pruning, of an entity space resulting from an ontological analysis of storage system computing resources. Pruning can be accelerated based on heuristic selection of a fork attribute. A K-D tree subjected to dimensional normalization can be employed to interpolate an attribute value. Interpolation can be performed from predetermined sets of data, for example from storage system models or historical storage system performance.

20 Claims, 10 Drawing Sheets

(51) Int. Cl.
   *G06F 16/22* (2019.01)
   *G06F 16/33* (2019.01)
   *G06F 16/245* (2019.01)
(52) U.S. Cl.
   CPC .......... *G06F 16/10* (2019.01); *G06F 16/2246* (2019.01); *G06F 16/2433* (2019.01); *G06F 16/24569* (2019.01); *G06F 16/334* (2019.01); *G06F 16/9024* (2019.01)
(58) Field of Classification Search
   CPC ............... G06F 16/2264; G06F 16/242; G06F 16/2433; G06F 16/24569; G06F 16/24558; G06F 16/283; G06F 16/288; G06F 16/3334; G06F 16/367
   See application file for complete search history.

(56) References Cited

U.S. PATENT DOCUMENTS

| | | | | |
|---|---|---|---|---|
| 2005/0278332 | A1* | 12/2005 | Petev | G06F 16/10 |
| 2008/0275683 | A1* | 11/2008 | Pang | G16C 10/00 |
| | | | | 703/11 |
| 2010/0115011 | A1* | 5/2010 | Callahan | G06F 16/13 |
| | | | | 707/828 |
| 2010/0205181 | A1* | 8/2010 | Chidlovskii | G06F 16/29 |
| | | | | 707/741 |
| 2019/0050479 | A1* | 2/2019 | Scriffignano | G06F 40/30 |
| 2020/0401931 | A1* | 12/2020 | Duan | G06F 18/23 |
| 2020/0409988 | A1* | 12/2020 | Singh | G06F 16/55 |
| 2021/0103827 | A1* | 4/2021 | Quamar | G06F 16/9024 |

OTHER PUBLICATIONS

Jon Louis Bentley et al., "K-d trees for semidynamic point sets", SCG '90: Proceedings of the sixth annual symposium on Computational geometryMay 1990 pp. 187-197.*

Wenfeng Hou et al., "An Advanced k Nearest Neighbor Classification Algorithm Based on KD-tree", IEEE International Conference of Safety Produce Informatization (IICSPI), Dec. 2018 , pp. 902-905.*

* cited by examiner

STORAGE CLUSTER CONFIGURATION

BACKGROUND

Conventional provisioning of data storage space of a storage system having a cluster topology can attempt to assign storage elements that generously exceed client expectations in order to offset uncertainties correlating to the actual expected performance of the selected storage elements being assigned. As an example, if a client indicates a threshold input/output process (IOP) threshold value, conventional provisioning can select storage elements that are believed to more than meet the IOP threshold. This can be viewed as being generally inefficient, e.g., selection of storage elements that adequately meet the indicate IOP threshold can be a more efficient use of storage system resources than selecting storage elements that generously exceed the IOP threshold. Moreover, conventional provisioning can be inaccurate, for example, attributes of storage system components can be affected by other selected storage elements, e.g., different mixes of storage elements can have different performance characteristics that can be thwart selections of appropriate storage elements under conventional techniques. Moreover, where human actors can often be part of conventional provisioning of storage space for a client, humans simply cannot accurately stay abreast of the performances of the vast numbers of combinations of storage elements that can be provisioned in a cluster for a client, and therefore a human can be observed to generally select storage solutions with a large performance margin to meet client demands, again being highly inefficient. Accordingly, it can be desirable to improve storage cluster configuration by enabling selection of efficient storage resource element combinations that accurately meet client specifications for storage.

DETAILED DESCRIPTION

Figure 1:
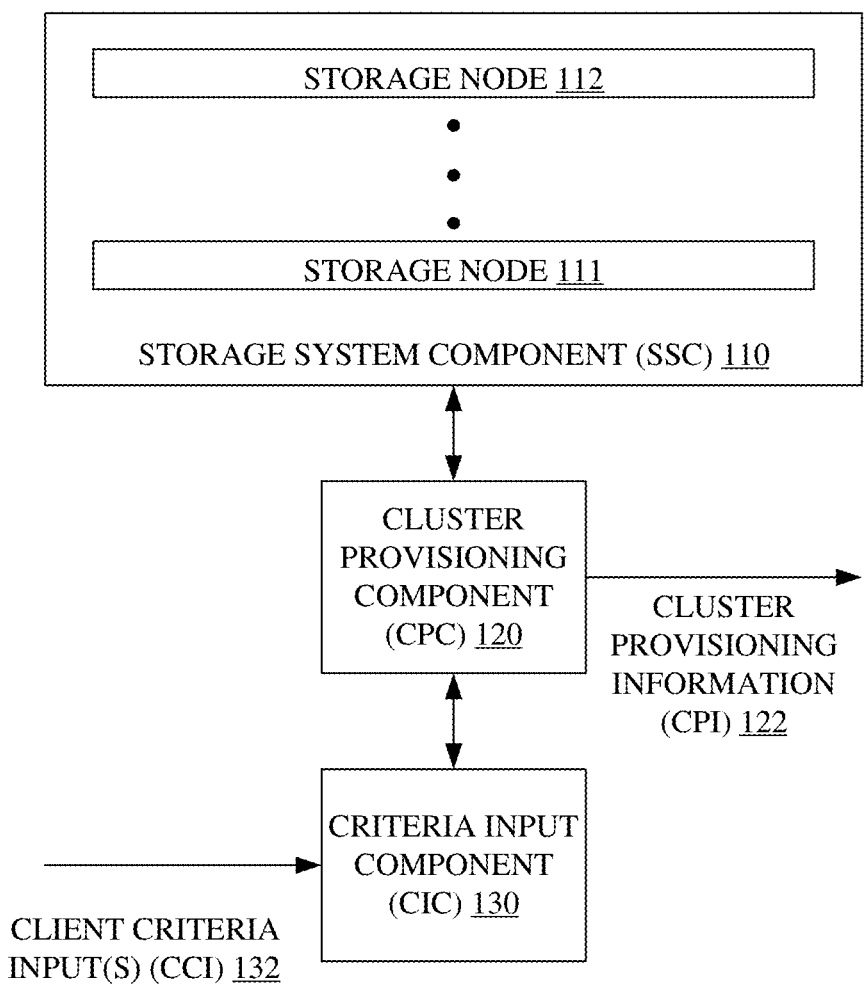
FIG. 1 is an illustration of an example system that can facilitate storage cluster configuration, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

In general, a storage system can comprise many different computing resources, e.g., storage devices, controllers, networking equipment etc., that can allow provisioning of a storage cluster via the storage system. The storage cluster, generally referred to as simply a 'cluster,' can therefore comprise local and/or remotely located storage elements from one or more storage devices. As examples, a cluster can comprise storage in a first data center; storage in two local data centers, storage in a local and a remotely located data center, etc. Embodiments of the presently disclosed subject matter can be operable in nearly any local or distributed storage system, e.g., storage clusters can be provisioned and can be in accordance with configurations determined according to the instant disclosure for nearly any storage system, accordingly, discussion of particular storage systems is intended to facilitate understanding of the disclosed subject matter and is not intended to limiting the disclosed subject matter to these exemplary storage systems.

Conventional provisioning of data storage space of a storage system into a storage cluster can frequently rely on a configuration of computing resources that has performance attributes that significantly exceed client criteria. This can be wasteful of computing resources where a configuration of less robust computing resources can still adequately meet the client criteria. However, because conventional configuration of clusters typically has insufficient, inaccurate, or poorly understood information relating to computing resources of a storage system, wastefully selecting overly robust computing resources for a cluster can be used to mitigate the possibility of not meeting client criteria for a cluster configuration. As an example, selecting a cluster controller that has a purported throughput that is double that of a client throughput criteria can be viewed as providing a sufficient margin of error such that, even if the actual throughput of the selected controller is less than the purported throughput, it is likely that the actual controller throughput will still exceed the client throughput criteria. While this margin can often be adequate, it is easily understood that the margin can be wasteful of the computing resource. Improved characterization of the computing resource, as disclosed herein, can therefore enable selecting more appropriate computing resources for a cluster. Generally, computing resources can also be associated with various types of costs, e.g., monetary costs, electrical consumption costs, dispersion of generated heat costs, support or manpower costs, real estate for deployment costs, etc. As such, selecting appropriate computing resource(s) can further be associated with optimizing cost(s).

Conventional cluster configuration can generally result in selection of computing resources that may be inappropriate, wasteful, inefficient, etc., which can be the result of the volume of selectable computing resources in modern storage systems being truly massive, e.g., tens of millions of candidate computing resources is quite normal in modern distributed storage systems that can be employed in the disclosed subject matter. As such, where conventional cluster configuration may have historically relied on a human selecting appropriate computing resources, the sheer number of computing resources available for selection in a modern storage system can make it infeasible for a human to sift through and select appropriate computing resources, notwithstanding the aforementioned typically lack of accurate computing resource characterization.

As such, the disclosed subject matter can provide for automated configuration of clusters based on client specifications, thereby removing the human from the process, and thereby removing the limitations of the human being unable to properly appreciate the attributes of the massive number of selectable computing resources available to a cluster executing in a modern storage system. Example embodiments can traverse and manipulate representations of computing resources of a storage system in a manner that can enable selection of computing resources for a cluster configuration that can therefore preferably be less wasteful and more accurately selected. In an example, conventionally a human operator might simply select a high-end storage device for a cluster configuration that could still meet client criteria with a mid-level storage device because the human operator can be unaware of the mid-level storage device, not understand the actual performance of the mid-level storage device, not appreciate how mixing the mid-level storage device with other storage devices in the cluster configuration can affect the overall performance of a resulting cluster, etc., and therefore the human can prefer to default to high-end storage devices in an attempt to overcompensate for the failings of human actors in the face of the massive amounts of selectable computing resources for clusters of a modern storage system. The disclosed subject matter, allied to the preceding example, can instead organize computing resources based on an ontological system, then iteratively prune an example tree structure to select storage devices that can meet client criteria, where the iterative pruning can be performed for nearly any mix of available computing resources. In this regard, for this example, mixing the example mid-level storage device with other storage devices in the cluster can be determined to be likely to alter performance of a corresponding candidate cluster, such that the altered performance can be used to iteratively prune that mix of storage devices from the tree. This example iterative pruning can therefore traverse candidate clusters to arrive at a group of acceptable candidate clusters in a way that no human can do in the context of a modern storage system.

Moreover, the disclosed subject matter can provide for ordering, sorting, ranking, etc., candidate cluster configurations. This can allow for selection of a preferred cluster configuration. The preferred cluster configuration can be any candidate cluster configuration that satisfies the client criteria and can be selected based on additional criteria. As an example, where five candidate clusters satisfy the client criteria, provisioning of the lowest monetary cost candidate cluster can be initiated. As another example, where five candidate clusters satisfy the client criteria, provisioning of a candidate cluster can be based on wear-leveling of the storage system. Numerous other examples of preferential selection of satisfactory cluster configurations are readily apparent and are within the scope of the instant disclosure even where not explicitly rejected for the sake of clarity and brevity.

In embodiments, computing resource attributes can undergo scaling, normalization, etc., to enable improved ranking, sorting, ordering, etc. Scaling, normalization, etc., can be employed in interpolation processes to avoid highly incongruent values from skewing resulting interpolated values. As an example, a first attribute of a computing resource can vary between values that can be orders of magnitude smaller than values of a second attribute, whereby the second attribute might inject significantly more influence into an interpolated result than the first attribute. Similarly, in another example a first value of the first attribute can be orders of magnitude different than a second value of the second attribute, e.g., while the range of attribute values can be incongruent, so to can individual attribute values. These example illustrate that there can be a wide variation between both actual attribute values and also between attribute value ranges. As such, some scaling, normalization, etc., typically inclusively referred to as normalization hereinafter, can facilitate sorting, ordering, ranking, of candidate cluster configurations based on these normalized attributes, e.g., interpolated values based on normalized attributes, as is disclosed herein. Moreover, as is also disclosed herein, normalization can be performed for each combination of attributes employed in a candidate cluster configuration, which can enable comparison of configurations that can comprise different attributes. Further, the normalization disclosed herein can support efficient determination of satisfactory candidates, e.g., pruning of a tree-structure to determine resulting satisfactory candidate cluster configuration prior to sorting/ordering/ranking satisfactory candidate cluster configuration, can leverage normalized attributes.

In some embodiments, attributes can be initially known. However, some attributes can need to be determined. Additionally, some attributes can be inferred. In an example, a disk drive of a storage system can have a stated data access speed that can be initially known. In this example, historical data can be used to determine that the actual data access speed of the example disk drive is different from the stated access speed. Moreover, in this example, a storage system model can be used to determine that when the example disk drive is controlled by a first type of cluster controller that the data access speed is different than when the example drive is controlled by a second type of cluster controller and, as such, candidate cluster configurations having the drive under different cluster controllers can have different attribute values for data access to the example drive. Furthermore, in this example, a model of the storage system can not include modeling of the example drive with a third type of cluster controller, however, machine learning or artificial intelligence, etc., hereinafter generally inclusively referred to as machine learning, can be used to infer an access speed for the example drive with the third type of cluster controller. Accordingly, data modeling, machine learning, etc., either alone or in combination, can be employed to support configuring a storage cluster as disclosed herein. As an example, pruning of an example tree model of the storage system, or portion thereof, can be based on a known, determined, modeled, inferred, etc., attribute value. As another example, ranking, sorting, ordering, etc., of candidate cluster configurations can be based, at least in part, on a known, determined, modeled, inferred, etc., attribute value.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate storage cluster configuration, in accordance with aspects of the subject disclosure. System 100 can comprise a storage system component (SSC) 110 that can comprise a plurality of storage nodes, e.g., storage node 111, storage node 112, etc. A storage node can comprise storage elements, e.g., storage devices, disks, solid state storage devices, optical storage devices, and/or nearly any other type of storage devices. In embodiments, SSC 110 can comprise local storage nodes, e.g., storage node 111, 112, etc., can be local, for example in a data center. In other embodiments, SSC 110 can comprise remotely located storage nodes, e.g., storage node 111 can be located remotely from storage node 112, etc., for example, SSC 110 can be embodied in a distributed storage system with storage nodes in different cities, different regions, different states, different countries, etc.

SSC 110 can be coupled with cluster provisioning component (CPC) 120. CPC 120 can enable provisioning of storage clusters that can comprise storage elements from one or more SSC 110. As an example, a cluster comprising storage elements in a different remotely located storage nodes, such as in different countries, can be provisioned via CPC 120. Other examples are within the scope of the instant disclosure even where not recited for the sake of clarity and brevity. In example embodiments, CPC 120 can communicate cluster provisioning information (CPI) 122. CPI 122 can be employed to provision a storage cluster. As an example, CPI 122 can be communicated to one or more data centers to enable controllers in the data centers to provide storage elements for provisioning of a corresponding cluster whose configuration is determined by CPC 120. In this example, CPC 120 can communicate CPI 122 to cause provisioning of the corresponding storage cluster.

System 100 can further comprise criteria input component (CIC) 130. CIC 130 can receive client criteria input(s) (CCI) 132 that can embody client selected storage cluster criteria. CCI 132 can, in various embodiments, be received via client-side user equipment (UE). As an example, a client can specify cluster requirements as CCI 132 via a user terminal at a client facility, whereby CCI 132 can be communicated, e.g., via a network or other communication link, to CIC 130. CIC 130 can analyze CCI 132 and can communicate information to CPC 120 to facilitate CPC 120 analyzing and selecting storage elements for inclusion in a selectable candidate cluster configuration. Selectable candidate cluster configurations can be ranked, sorted, ordered, etc., to facilitate selection of a cluster configuration via CIC 130, e.g., CCI 132 can comprise information relating to desired cluster performance criteria as well as other information relating to desired sorting/ranking/ordering parameters that can include selection criteria. In some embodiments, CCI 132 can be divided into different phases, e.g., a first phase of CCI 132 can indicate cluster requirements to allow CIC 130 and CPC 120 to determine a group of candidate cluster configurations, then a second phase of CCI 132 can indicate ranking criteria to enable ranking ordering of the determined candidate cluster configurations, then a third phase of CCI 132 can indicate selection preference information enabling selection of a preferred candidate cluster configuration from the candidate cluster configurations. In this example, the selection of the preferred candidate cluster configuration via CIC 130 can result in CPC 120 communicating corresponding CPI 122 to trigger provisioning of the preferred candidate cluster configuration for use by the client.

In embodiments, CPC 120 can analyze computing resources, e.g., storage elements, controllers, networks components, etc., comprising at least a portion of SSC 110. The analysis can determine attributes of the computing resources embodying at least the analyzed portion of SSC 110. This can enable CPC 120 to organize representation of the computing resources of SSC 110, for example, in an object-oriented ontology that can support querying of the representations of the SSC 110 computing resources. This example object-oriented ontology can therefore support recursive combinatorial search with pruning, for example via a K-D tree employed in interpolation of values, etc., to enumerate possible cluster configurations based on CCI 132. The enumerations of possible cluster configurations, as has been noted elsewhere herein, can be sorted, ordered, ranked, etc., by one or more attribute. Moreover, the enumerations of possible cluster configurations can employ scaled/normalized attribute values to facilitate pruning operations, neighbor searching operations, or other operations in the object-oriented ontology.

In an embodiment, the object-oriented ontology can comprise entities, wherein an entity can be a named tuple of attributes that can represent a computing resource of SSC 110, e.g., a node, a drive, a network component, a controller component, the entirety of SSC 110, etc. An attribute can be a value associated with an entity. An attribute can be a variable value that can vary over a group of possible values. A select variable can represent a selection of a sub-entity subclass in the ontology, this can enable selecting classes of entities, e.g., selecting a node type within SSC 110. An attribute can also be a value that cannot be freely chosen, but rather can be determined based on an entity and state of that entity, e.g., the assignment of entity variables can result in other variables becoming correspondingly fixed. These types of variables can be constant values, such as read throughput for a selected storage device entity, or can be algorithmically derived, for example deriving a total storage capacity of a node based on a selected count of drives in the node. Moreover, these types of variables can further comprise dynamic values, for example a metering rate that is externally set can be determined upon selection of a computing resource associated with the metering rate, these dynamic variables can be termed 'injects.' CPC 120 can support performance of recursive combinatorial searching with pruning according to a query schedule for execution of queries.

In embodiments, CPC 120 can analyze the SSC 110 ontology and query parameters embodied in CCI 132 received via CIC 130. CPC 120 can apply a ranking/ordering/sorting heuristic to generate a query schedule. The query schedule can indicate a recursion order and pruning operations that can be performed. In embodiments, the analysis can determine which attributes in the ontology are relevant to the query, e.g., a relevant computing resource entity attribute can be relevant if the attribute is an output column, is subject to a constraint, is subject to an inherent relational restriction in the ontology, is a transitive dependency of another relevant attribute, etc. In some embodiments, dependencies can be determined empirically, for example by evaluating derived attributes on an arbitrary entity instance and then monitoring attribute accesses. This can support topologically sorting the entities of SSC 110, e.g., the computing resources, so that the query schedule can reflect data dependencies between entities. Embodiments can determine a rank for each attribute via a heuristic. The attribute rank can represent a priority of the scheduler to recurse on, or prune the ontology, based on the corresponding attribute. As such, recursing first on attributes which are likely to result in quick pruning of the search space can then be favored via the heuristic ranking of the entity attributes. As an example, ranking can be based on a simple sum of how many restrictions and constraints transitively depend on an attribute. As a more sophisticated example, attribute weighting values can be employed, e.g., de-weighting attributes based on their estimated expense to compute, weighting constraints, and attributes on which they depend, based on domain-specific information reflecting a corresponding constraining the search space, etc.

In embodiments, queries can be executed according to the query schedule. A query, in some embodiments, can be executed from an unfilled root entity, with operational forks at variables, e.g., each variable value can lead to a different branch. This can be recurse for each branch with corresponding subsequent variables. Pruning operations can evaluate relevant predicates. A relevant predicate can evaluate to 'false,' which can cause the associated fork/branch to be abandoned in future searches of a given query. Execution of the query can be accelerated, for example by placing a fork on a queue processed by a parallel group of worker processes. It is noted that if a fork reaches the end of the schedule without being pruned, that fork can then become a result of the query. The resulting entity can be indicated in row form and any requested fields can be yielded to CIC 130. Accordingly, the recursive searching of the ontology can provide candidate cluster configurations that can be further sorted, ranked, ordered, etc., to enable selection of a preferred candidate cluster configuration via CIC 130.

In embodiments, some variables, especially dependent variables, can be estimated or inferred. An attribute value can be estimated, for example, by using other attributes to interpolate a value, e.g., interpolation over a pre-computed dataset. As an example, mean time to data loss (MTTDL) can be estimated based on values from datasets generated with via a failure simulator, failure model, etc. In some embodiments, machine learning can be trained, for example with historical SSC 110 key performance indicator (KPI) data, to predict a value for a variable, e.g., a variable's value can be inferred via machine learning. It is noted that data sets used for interpolation or inferences can be normalized, scaled, etc., for example, by shifting each value so that each dimension (column) has a total range of [0,1], etc. Where different dimensions are non-commensurate, normalization/scaling can facilitate their use for interpolation of variable values. As an example, ranges of network bandwidth, drive sizes, and node counts can differ by orders of magnitude depending on units used, which can cause any "distance" computed using raw values to be dominated by dimensions that tend to have large values, however normalization/scaling can mitigate this issue.

In embodiments, interpolation can be based on inverse distance weighting (IDW), that can estimate a value at a particular coordinate by a weighted average of values of nearby datapoints, where each weight can be inversely proportional to a power of distance of the point from the interpolation coordinate. An exponent can determine how quickly influence of a point degrades, e.g., "falls off." It is noted that, rather than using all values in the dataset, instead nearest N points can be queried from a K-D tree for use. As such, the number of points used can be configurable, although generally the number of points defaults to 2 to the dimensionality of the data. As such, in higher dimensions each "neighborhood" can be larger and therefore more points can be sampled. This can mathematically improve performance and can also avoid a hazard where, depending on the distance exponent used, interpolated values not in the immediate vicinity of a datapoint tend toward the global average value.

In embodiments, CCI 132 criteria can comprise, for example, an effective cluster storage capacity, a count of input-output processes (IOPs), a throughput, a count of network addresses that should be accessible by client devices, a recurring monetary cost, etc. In embodiments, CPC 120 can determine cluster criteria for candidate cluster configurations and can reflect information, such as, a number of storage nodes, different classes of computing resources such as tiers reflecting CPU count, volume of RAM, etc., storage element types, storage element sizes, storage element counts, e.g., number of storage drives per node, etc., a count of accelerator nodes, tiers of accelerator nodes, a cluster protection level, etc. Moreover, candidate cluster configurations can also be determined to satisfy internal constraints, for example those imposed by engineering. Accordingly, in embodiments, an object-oriented ontology can describe computing resources entities of SSC 110, which can for example include a range of supported node counts, types of nodes available, types of drives available, a range of supported drive counts, drive sizes, etc. CPC 120 can determine candidate cluster configurations based on CCI 132 received via CIC 130. Queries can be performed by recursive combinatorial search with pruning. The search order can be determined by a query schedule that can be based on data dependencies between attributes in the ontology and heuristics to favor early pruning, for example, an MTTDL constraint can be based on first recursing on attributes such node count and drive size so the MTTDL constraint can be evaluated with concrete values. If a constraint from CCI 132 is not met in the query, further combinations of unrelated attributes below that node in the search tree can be pruned. In the query, some attribute values can be interpolated, for example from precomputed data sets. The interpolation can, for example, use a K-D tree to allow rapid spatial searching of the resulting multidimensional space, particularly via weighted or unweighted nearest-neighbor searching operations. In some embodiments, machine learning can be employed to infer attribute values. In some embodiments, interpolation can be based on inverse distance weighting (IDW) of N nearest neighbors of the interpolation coordinate. Interpolation can be integrated into the ontology so that the query engine can consider constraints involving interpolated/inferred values.

Figure 2:
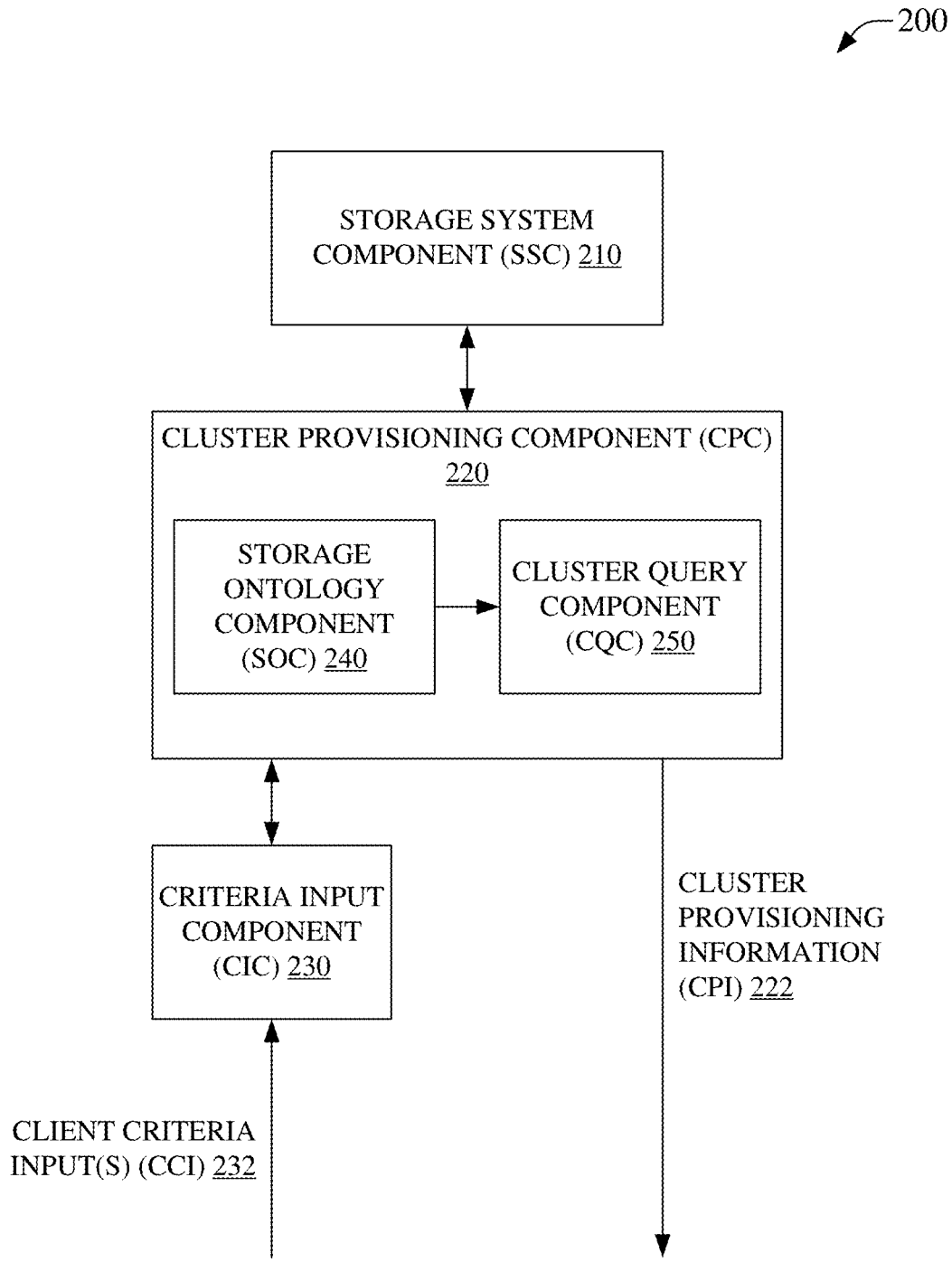
FIG. 2 is an illustration of an example system enabling storage cluster configuration based on a storage element ontology, in accordance with aspects of the subject disclosure.

FIG. 2 is an illustration of an example system 200 enabling storage cluster configuration based on a storage element ontology, in accordance with aspects of the subject disclosure. System 200 can comprise a storage system component (SSC) 210 that can comprise a plurality of storage nodes. A storage node can comprise storage elements, e.g., storage devices, disks, solid state storage devices, optical storage devices, and/or nearly any other type of storage devices. In embodiments, SSC 210 can comprise local storage nodes, for example in a single data center. In other embodiments, SSC 210 can comprise remotely located storage nodes, for example, SSC 210 can be embodied in a distributed storage system with storage nodes in different data centers, different cities, different regions, different states, different countries, etc.

SSC 210 can be coupled with cluster provisioning component (CPC) 220 that can enable provisioning of storage clusters that can comprise storage elements from one or more SSC 210. In example embodiments, CPC 220 can communicate cluster provisioning information (CPI) 222. CPI 222 can be employed to provision a storage cluster. As an example, CPI 222 can be communicated to one or more data centers to enable controllers in the data centers to provide storage elements corresponding to provisioning of a cluster whose configuration was determined by CPC 220. In this example, CPC 220 can communicate CPI 222 to cause provisioning of the corresponding storage cluster.

CPC 220 can determine storage cluster configurations. In an embodiment, CPC 220 can comprise storage ontology component (SOC) 240 that can analyze computing resources of SSC 210 to determine ontological entities, wherein an entity can be a named tuple of attributes that can represent a computing resource of SSC 210, e.g., a node, a drive, a network component, a controller component, etc. An attribute can be a value associated with an entity. An attribute can be a variable value that can vary over a group of possible values. As disclosed elsewhere herein, variables can be further classified within the ontological structure, e.g., some variables values can be freely selected, some variables can have constrained values that can depend on other values, etc. SOC 240 can communicate ontological information about entities representing computing resources of SSC 210 to cluster query component (CQC) 250.

Cluster query component (CQC) 250 can enable querying of computing resources of SSC 210 to determine candidate cluster configurations based on corresponding entities indicated by SOC 240. In this regard, SOC 240 can ontologically analyze computing resources of SSC 210 to facilitate CQC 250 queries to generate candidate cluster configurations, which can be based on CCI 232 received via CIC 230. As such, CPI 222 generated by CPC 220 can indicate computing resources to be provisioned that correspond to entities of a candidate cluster configuration determined by CQC 250 and selected based on CCI 232, e.g., CCI 232 can facilitate determining candidate cluster configurations and can further facilitate selecting a preferred candidate cluster configuration of the candidate cluster configurations, which can result in CPI 222 that can be employed to actually provision a storage cluster that comports with the preferentially selected candidate cluster configuration.

Accordingly, system 200 can comprise criteria input component (CIC) 230. CIC 230 can receive client criteria input(s) (CCI) 232 that can embody client selected storage cluster criteria. CCI 232 can, in various embodiments, be received via client-side UE(s). CCI 232 can facilitate determining candidate cluster configurations, e.g., via CQC 250 based on entities determined by SOC 240. The candidate cluster configurations can be further be ranked, sorted, ordered, etc., to facilitate selection of a preferred cluster configuration based on CCI 232, e.g., CCI 232 can comprise information relating to desired cluster performance criteria as well as other information relating to desired sorting/ranking/ordering parameters that can include selection criteria. Selection of a preferred candidate cluster configuration can result in CPC 220 communicating corresponding CPI 222, whereby CPI 222 can enable provisioning of a preferred storage cluster in accord with the candidate cluster configuration determined by CQC 250 based on entity information from SOC 240 and CCI 232 via CIC 230.

In embodiments, CQC 250 can receive element information from SOC 240, wherein element information can correspond to a computing resource of SSC 210 analyzed by SOC 240 according to an ontology. CQC 250 can perform a recursive combinatorial search with pruning of the ontology based on query parameters determined from CCI 232 that has been received via CIC 230. CQC 250 can also apply a ranking/ordering/sorting heuristic to a query schedule to accelerate early pruning of the ontology, e.g., earlier pruning according to variables that are more likely to remove larger splits of an ontology followed by later pruning according to other variables that remove comparatively smaller splits of the ontology from contributing results to candidate cluster configurations. A query schedule can therefore indicate a recursion order and pruning operations that can be performed. In embodiments, the ontological analysis of computing resources by SOC 240 to determine entities can determine which attributes in the ontology are relevant to a query corresponding to CCI 232, e.g., a relevant computing resource attribute for an entity can be relevant if the attribute is an output column, is subject to a constraint, can be subject to an inherent relational restriction in an ontology, is a transitive dependency of another relevant attribute, etc., e.g., if queries do not consider storage device brand names, then SOC 240 can exclude brand names from the ontology even though the information can be otherwise available from SSC 210. In some embodiments, dependencies can be determined empirically, for example by evaluating derived attributes on an arbitrary entity instance and then monitoring attribute accesses. This can support topologically sorting entity representations of computing resources of SSC 210 so that the query schedule of CQC 250 can reflect data dependencies between entities. Embodiments can determine a rank for each attribute via a heuristic. The attribute rank, as previously noted, can represent a priority of the scheduler to recurse on, or prune the ontology during the query, based on the corresponding attribute. As such, recursing first on attributes which are likely to result in quick pruning of the search space can then be favored via the heuristic ranking of the entity attributes. As an example, ranking can be based on a simple sum of how many restrictions and constraints transitively depend on an attribute. As a more sophisticated example, attribute weighting values can be employed, e.g., de-weighting attributes based on their estimated expense to compute, weighting constraints, and attributes on which they depend, based on domain-specific information reflecting a corresponding constraining the search space, etc.

Candidate cluster configurations can be determined to satisfy CCI criteria and other internal constraints, for example, storage element wear leveling, incrementing use of lower cost, both monetary cost and other cost, computing resources, decrementing use of computing resources scheduled for maintenance, etc. Accordingly, in embodiments, an object-oriented ontology used by SOC 240 can describe computing resources of SSC 210 as entities that can have a topology that can be recursively combinatorial searched with pruning. CQC 250, based on the ontological analysis of SSC 210 performed by SOC 240, can then determine candidate cluster configurations further based on CCI 232 received via CIC 230. Queries can be performed by recursive combinatorial search with pruning to exclude ontological splits of elements to quickly determine resulting candidate cluster configurations that satisfy cluster criteria indicated via CCI 232. The search order and pruning can be determined by a query schedule that can be based on data dependencies between attributes in the ontology and heuristics to favor early pruning where, if a constraint from CCI 232 is not met in the query, further combinations of unrelated attributes below that node in the search tree can be pruned. In the query, some attribute values can be interpolated, for example from precomputed data sets. The interpolation can, for example, use a K-dimensional tree (K-D tree) to allow rapid spatial searching of the resulting multidimensional space, particularly via weighted or unweighted nearest-neighbor searching operations. In some embodiments, machine learning can be employed to infer attribute values. In some embodiments, interpolation can be based on inverse distance weighting (IDW) of N nearest neighbors of the interpolation coordinate. Interpolation can be integrated into the ontology so that the query engine can consider constraints involving interpolated/inferred values. Of the candidate resulting cluster configurations, CCI 232 can further be employed to determine a candidate cluster configuration of the candidate cluster configurations to implement, which candidate cluster configuration information can be embodied in CPI 222. As such, CPI 222 can enable provisioning of a storage cluster in accord with a selected candidate cluster configuration.

Figure 3:
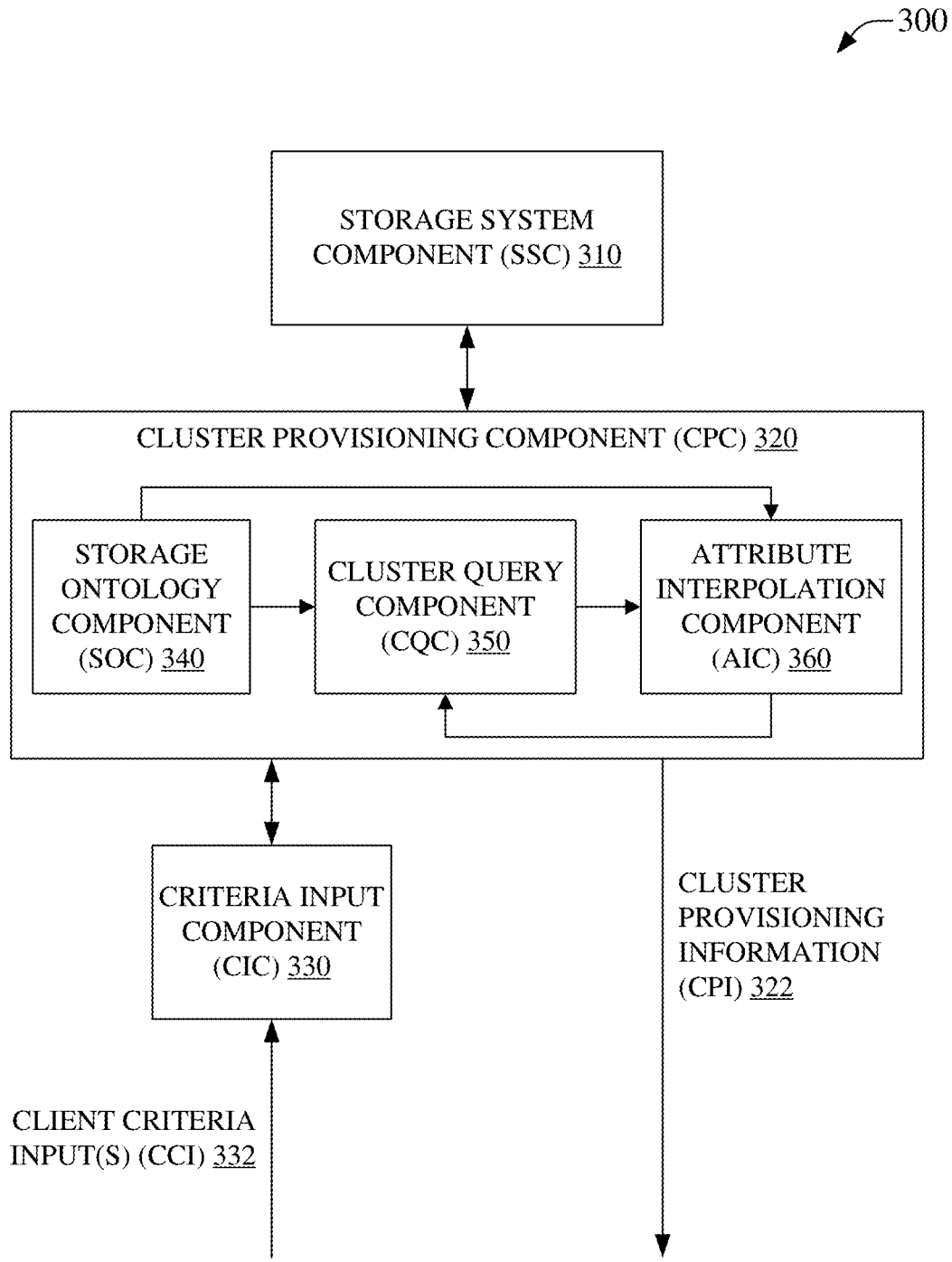
FIG. 3 illustrates an example system that can enable storage cluster configuration implementation attribute interpolation, in accordance with aspects of the subject disclosure.

FIG. 3 is an illustration of a system 300, which can facilitate storage cluster configuration implementation attribute interpolation, in accordance with aspects of the subject disclosure. System 300 can comprise a storage system component (SSC) 310 that can comprise a plurality of storage nodes. A storage node can comprise storage elements, e.g., storage devices, disks, solid state storage devices, optical storage devices, and/or nearly any other type of storage devices. In embodiments, SSC 310 can comprise local storage nodes, for example in a single data center. In other embodiments, SSC 310 can comprise remotely located storage nodes, for example, SSC 310 can be embodied in a distributed storage system with storage nodes in different data centers, different cities, different regions, different states, different countries, etc.

SSC 310 can be coupled with cluster provisioning component (CPC) 320 that can enable provisioning of storage clusters that can comprise storage elements from one or more SSC 310. In example embodiments, CPC 320 can communicate cluster provisioning information (CPI) 322. CPI 322 can be employed to provision a storage cluster. As an example, CPI 322 can be communicated to one or more data centers to enable controllers in the data centers to provide storage elements corresponding to provisioning of a cluster whose configuration was determined by CPC 320. In this example, CPC 320 can communicate CPI 322 to cause provisioning of the corresponding storage cluster.

CPC 320 can determine storage cluster configurations. In an embodiment, CPC 320 can comprise storage ontology component (SOC) 340 that can analyze computing resources of SSC 310 to determine ontological entities, wherein an entity can be a named tuple of attributes that can represent a computing resource of SSC 310, e.g., a node, a drive, a network component, a controller component, etc. An attribute can be a value associated with an entity. An attribute can be a variable value that can vary over a group of possible values. As disclosed elsewhere herein, variables can be further classified within the ontological structure, e.g., some variables values can be freely selected, some variables can have constrained values that can depend on other values, etc. As is also noted elsewhere herein, some variable values can be determined via interpolation, e.g., attribute values can be interpolated from precomputed data sets. Interpolation can, for example, employ a K-D tree to allow spatial searching of a resulting multidimensional space, particularly via weighted or unweighted nearest-neighbor searching operations. In some embodiments, machine learning can be similarly employed to infer attribute values. In some embodiments, interpolation can be based on inverse distance weighting (IDW) of N nearest neighbors of the interpolation coordinate. Interpolation can be integrated into the ontology, e.g., via attribute interpolation component (AIC) 360. AIC 360 can receive entity information from SOC 340 and can generate interpolated values that can be employed by CQC 350 in determining candidate cluster configurations. As an example, an entity can comprise a first attribute with a value that can be dependent on several other variable values in a non-deterministic manner. In this example, an embodiment of AIC 360, in response to an indication from CQC 350, can spatially search a K-D tree, across multidimensional space corresponding to the several other variable values, to interpolate a value for the first variable. This interpolated value for the first variable in the example can then be provided to CQC 350 to enable CQC 350 to determine candidate cluster configurations based on the first variable. As in other embodiments, SOC 340 can communicate ontological information about entities representing computing resources of SSC 310 to cluster query component (CQC) 350.

Cluster query component (CQC) 350 can enable querying of computing resources of SSC 310 to determine candidate cluster configurations based on corresponding entities indicated by SOC 340. In this regard, SOC 340 can ontologically analyze computing resources of SSC 310 to facilitate CQC 350 queries to generate candidate cluster configurations, which can be based on CCI 332 received via CIC 330. In an aspect, where an entity can comprise a variable value that is to be determined via interpolation, AIC 360 can perform interpolation to yield such values to CQC 350. In embodiments, AIC 360 can similarly employ machine learning to infer a value in place of interpolation. As such, CPI 322 generated by CPC 320 can indicate computing resources to be provisioned that correspond to entities of a candidate cluster configuration determined by CQC 350 and selected based on CCI 332, e.g., CCI 332 can facilitate determining candidate cluster configurations and can further facilitate selecting a preferred candidate cluster configuration of the candidate cluster configurations, which can result in CPI 322 that can be employed to actually provision a storage cluster that comports with the preferentially selected candidate cluster configuration.

System 300 can comprise criteria input component (CIC) 330 that can receive client criteria input(s) (CCI) 332. CCI 332 can embody client selected storage cluster criteria. CCI 332 can, in various embodiments, be received via client-side UE(s). CCI 332 can facilitate determining candidate cluster configurations, e.g., via CQC 350 based on entities determined by SOC 340 and interpolated values via AIC 360. The candidate cluster configurations can be further be ranked, sorted, ordered, etc., to facilitate selection of a preferred cluster configuration based on CCI 332, e.g., CCI 332 can comprise information relating to desired cluster performance criteria as well as other information relating to desired sorting/ranking/ordering parameters that can include selection criteria. Selection of a preferred candidate cluster configuration can result in CPC 320 communicating corresponding CPI 322, whereby CPI 322 can enable provisioning of a preferred storage cluster in accord with the candidate cluster configuration determined by CQC 350 based on entity information from SOC 340, AIC 360, and CCI 332.

Figure 4:
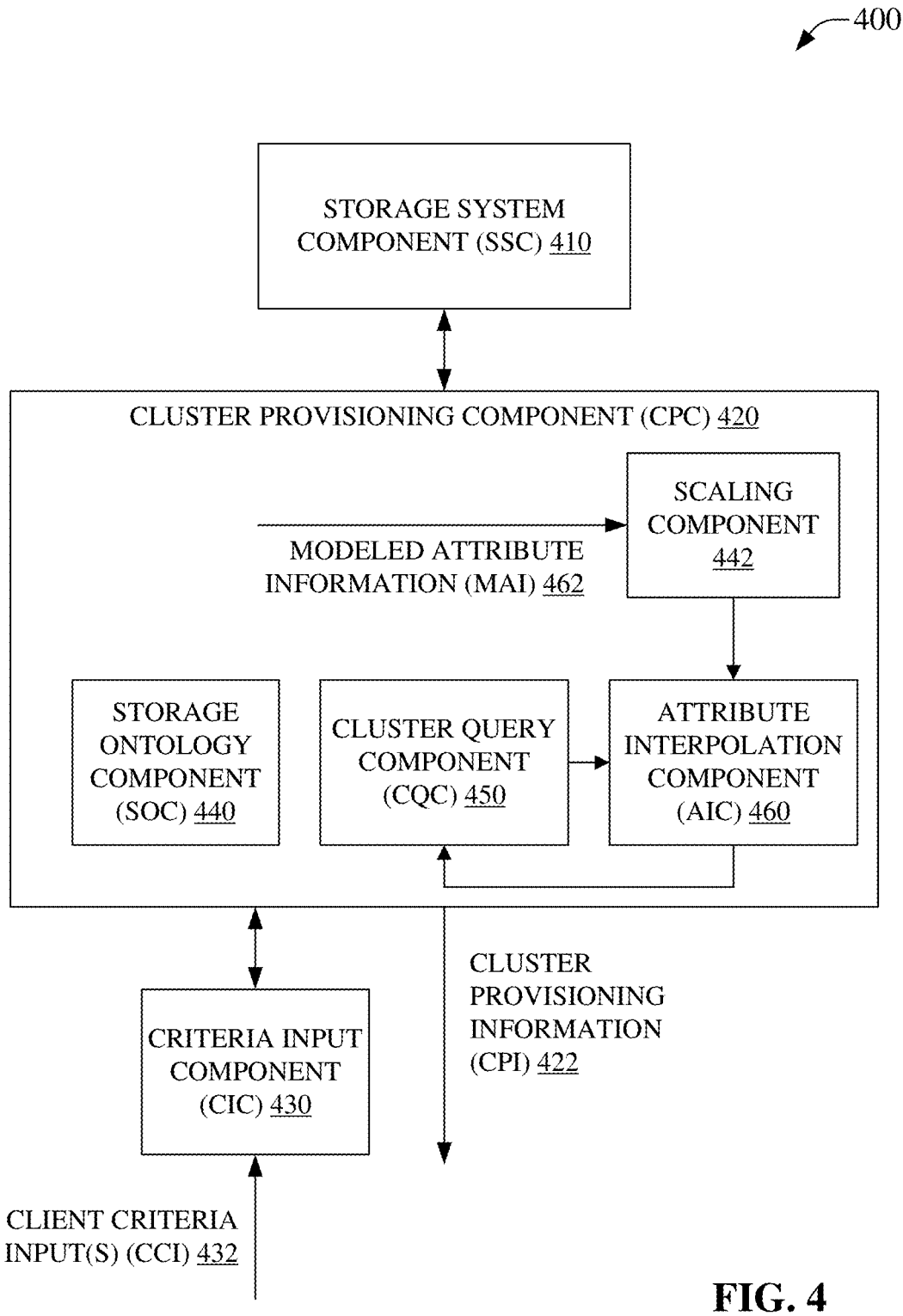
FIG. 4 is an illustration of an example system facilitating storage cluster configuration with attribute interpolation based on modeled attribute information, in accordance with aspects of the subject disclosure.

FIG. 4 is an illustration of an example system 400, which can enable storage cluster configuration with attribute interpolation based on modeled attribute information, in accordance with aspects of the subject disclosure. System 400 can comprise a storage system component (SSC) 410 that can comprise a plurality of storage nodes. A storage node can comprise storage elements, e.g., storage devices, disks, solid state storage devices, optical storage devices, and/or nearly any other type of storage devices. In embodiments, SSC 410 can comprise local storage nodes, for example in a single data center. In other embodiments, SSC 410 can comprise remotely located storage nodes, for example, SSC 410 can be embodied in a distributed storage system with storage nodes in different data centers, different cities, different regions, different states, different countries, etc.

SSC 410 can be coupled with cluster provisioning component (CPC) 420 that can enable provisioning of storage clusters that can comprise storage elements from one or more SSC 410. In example embodiments, CPC 420 can communicate cluster provisioning information (CPI) 422. CPI 422 can be employed to provision a storage cluster. As an example, CPI 422 can be communicated to one or more data centers to enable controllers in the data centers to provide storage elements corresponding to provisioning of a cluster whose configuration was determined by CPC 420. In this example, CPC 420 can communicate CPI 422 to cause provisioning of the corresponding storage cluster.

CPC 420 can determine storage cluster configurations. In an embodiment, CPC 420 can comprise storage ontology component (SOC) 440 that can analyze computing resources of SSC 410 to determine ontological entities, wherein an entity can be a named tuple of attributes that can represent a computing resource of SSC 410, e.g., a node, a drive, a network component, a controller component, etc. An attribute can be a value associated with an entity. An attribute can be a variable value that can vary over a group of possible values. As disclosed elsewhere herein, variables can be further classified within the ontological structure, e.g., some variables values can be freely selected, some variables can have constrained values that can depend on other values, etc. As is also noted elsewhere herein, some variable values can be determined via interpolation, e.g., attribute values can be interpolated from precomputed data sets. Interpolation can employ, for example, a K-D tree to allow spatial searching of a resulting multidimensional space, particularly via weighted or unweighted nearest-neighbor searching operations. In some embodiments, machine learning can be similarly employed to infer attribute values. In some embodiments, interpolation can be based on inverse distance weighting (IDW) of N nearest neighbors of the interpolation coordinate. Interpolation can be integrated into the ontology, e.g., via attribute interpolation component (AIC) 460. AIC 460 can receive entity information from SOC 440. AIC 460 can generate interpolated values that can be employed by CQC 450 in determining candidate cluster configurations. As an example, an entity can comprise a first attribute whose value can be dependent on several other variable values in a non-deterministic manner. In this example, an embodiment of AIC 460, in response to an indication from CQC 450, can spatially search a K-D tree, across multidimensional space corresponding to the several other variable values, to interpolate a value for the first variable. This interpolated value for the first variable in the example can then be provided to CQC 450 to enable CQC 450 to determine candidate cluster configurations based on the first variable. As in other embodiments, SOC 440 can communicate ontological information about entities representing computing resources of SSC 410 to cluster query component (CQC) 450.

In embodiments, AIC 460 can interpolate based on predetermined data, sometimes also referred to as precomputed data, e.g., modeled attribute information (MAI) 462, etc. However, predetermined data reflecting, for example, attribute values from computer models of an entity can result in different dimensions of a K-D tree that are non-commensurate. This disparity between K-D tree dimensions can result in a dimension dominating interpolation, which can typically be undesirable. As such, scaling component 442 can be employed to normalize, scale, etc., data, e.g., MAI 462, etc., that can be used for interpolation of variable values at AIC 460. In embodiments, predetermined data can be received from SOC 440 or CQC 450. In other embodiments, CPC 420 can pass MAI 462 into AIC 460, e.g., via scaling component 442, to facilitate interpolation.

Cluster query component (CQC) 450 can enable querying of computing resources of SSC 410 to determine candidate cluster configurations based on corresponding entities indicated by SOC 440. In this regard, SOC 440 can ontologically analyze computing resources of SSC 410 to facilitate CQC 450 queries to generate candidate cluster configurations, which can be based on CCI 432 received via CIC 430. In an aspect, where an entity can comprise a variable value that is to be determined via interpolation, AIC 460 can perform interpolation to yield such values to CQC 450. In embodiments, AIC 460 can similarly employ machine learning to infer a value in place of interpolation. As such, CPI 422 generated by CPC 420 can indicate computing resources to be provisioned that correspond to entities of a candidate cluster configuration determined by CQC 450 and selected based on CCI 432, e.g., CCI 432 can facilitate determining candidate cluster configurations and can further facilitate selecting a preferred candidate cluster configuration of the candidate cluster configurations, which can result in CPI 422 that can be employed to actually provision a storage cluster that comports with the preferentially selected candidate cluster configuration.

System 400 can comprise criteria input component (CIC) 430 that can receive client criteria input(s) (CCI) 432. CCI 432 can embody client selected storage cluster criteria. CCI 432 can, in various embodiments, be received via client-side UE(s). CCI 432 can facilitate determining candidate cluster configurations, e.g., via CQC 450 based on entities determined by SOC 440 and interpolated values via AIC 460. The candidate cluster configurations can be further be ranked, sorted, ordered, etc., to facilitate selection of a preferred cluster configuration based on CCI 432, e.g., CCI 432 can comprise information relating to desired cluster performance criteria as well as other information relating to desired sorting/ranking/ordering parameters that can include selection criteria. Selection of a preferred candidate cluster configuration can result in CPC 420 communicating corresponding CPI 422, whereby CPI 422 can enable provisioning of a preferred storage cluster in accord with the candidate cluster configuration determined by CQC 450 based on entity information from SOC 440, AIC 460, and CCI 432.

Figure 5:
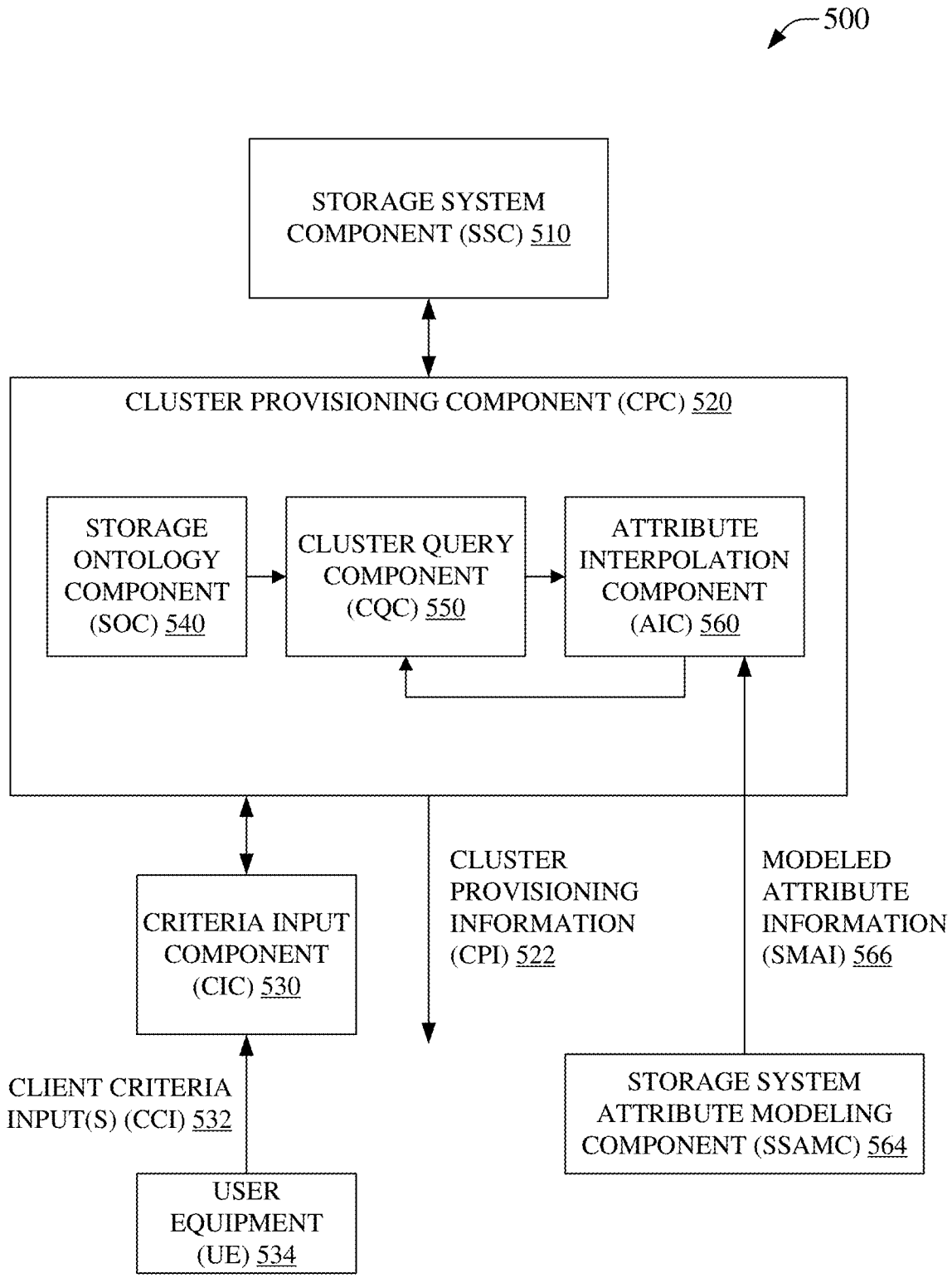
FIG. 5 is an illustration of an example system that can facilitate storage cluster configuration with attribute interpolation based on modeled attribute information received from a remotely located attribute modeling component, in accordance with aspects of the subject disclosure.

FIG. 5 is an illustration of an example system 500, which can enable storage cluster configuration with attribute interpolation based on modeled attribute information received from a remotely located attribute modeling component, in accordance with aspects of the subject disclosure. System 500 can comprise a storage system component (SSC) 510 that can comprise a plurality of storage nodes. A storage node can comprise storage elements, e.g., storage devices, disks, solid state storage devices, optical storage devices, and/or nearly any other type of storage devices. In embodiments, SSC 510 can comprise local storage nodes, for example in a single data center. In other embodiments, SSC 510 can comprise remotely located storage nodes, for example, SSC 510 can be embodied in a distributed storage system with storage nodes in different data centers, different cities, different regions, different states, different countries, etc.

SSC 510 can be coupled with cluster provisioning component (CPC) 520 that can enable provisioning of storage clusters that can comprise storage elements from one or more SSC 510. In example embodiments, CPC 520 can communicate cluster provisioning information (CPI) 522. CPI 522 can be employed to provision a storage cluster. As an example, CPI 522 can be communicated to one or more data centers to enable controllers in the data centers to provide storage elements corresponding to provisioning of a cluster whose configuration was determined by CPC 520. In this example, CPC 520 can communicate CPI 522 to cause provisioning of the corresponding storage cluster.

CPC 520 can determine storage cluster configurations. In an embodiment, CPC 520 can comprise storage ontology component (SOC) 540 that can analyze computing resources of SSC 510 to determine ontological entities, wherein an entity can be a named tuple of attributes that can represent a computing resource of SSC 510, e.g., a node, a drive, a network component, a controller component, etc. An attribute can be a value associated with an entity. An attribute can be a variable value that can vary over a group of possible values. As disclosed elsewhere herein, variables can be further classified within the ontological structure, e.g., some variables values can be freely selected, some variables can have constrained values that can depend on other values, etc. As is also noted elsewhere herein, some variable values can be determined via interpolation, e.g., attribute values can be interpolated from precomputed data sets. Interpolation can employ, for example, a K-D tree to allow spatial searching of a resulting multidimensional space, particularly via weighted or unweighted nearest-neighbor searching operations. In some embodiments, machine learning can be similarly employed to infer attribute values. In some embodiments, interpolation can be based on inverse distance weighting (IDW) of N nearest neighbors of the interpolation coordinate. Interpolation can be integrated into the ontology, e.g., via attribute interpolation component (AIC) 560. AIC 560 can receive entity information from SOC 540. AIC 560 can generate interpolated values that can be employed by CQC 550 in determining candidate cluster configurations. As an example, an entity can comprise a first attribute whose value can be dependent on several other variable values in a non-deterministic manner. In this example, an embodiment of AIC 560, in response to an indication from CQC 550, can spatially search a K-D tree, across multidimensional space corresponding to the several other variable values, to interpolate a value for the first variable. This interpolated value for the first variable in the example can then be provided to CQC 550 to enable CQC 550 to determine candidate cluster configurations based on the first variable. As in other embodiments, SOC 540 can communicate ontological information about entities representing computing resources of SSC 510 to cluster query component (CQC) 550.

In embodiments, AIC 560 can interpolate based on predetermined data, for example, data from a storage system attribute modeling component (SSAMC) 564. SSAMC 564 can generate data that can already be scaled to facilities K-D tree dimensions being commensurate, e.g., SSAMC 564 can provide scaled modeled attribute information (SMAI) 566 to AIC 560. In some embodiments, SSAMC 564 can generate unscaled data, e.g., analogous to MAI 462, in which embodiments, it can be desirable to pass the data through an analog of scaling component 442 to provide commensurate denationalized data to AIC 560. Where SSAMC 564 can generate data that does not have significantly non-commensurate dimensions, SMAI 566 can be unity scaled, e.g., the same as unscaled data, that does not need to pass through an analog of scaling component 442 because the dimensions are already comparatively commensurate and interpolated data is generally not significantly distorted by any particular dimension in the interpolation operation.

Cluster query component (CQC) 550 can enable querying of computing resources of SSC 510 to determine candidate cluster configurations based on corresponding entities indicated by SOC 540. In this regard, SOC 540 can ontologically analyze computing resources of SSC 510 to facilitate CQC 550 queries to generate candidate cluster configurations, which can be based on CCI 532 received via CIC 530, for example, from UE 534, etc. In an aspect, where an entity can comprise a variable value that is to be determined via interpolation, AIC 560 can perform interpolation to yield such values to CQC 550. In embodiments, AIC 560 can similarly employ machine learning to infer a value in place of interpolation. As such, CPI 522 generated by CPC 520 can indicate computing resources to be provisioned that correspond to entities of a candidate cluster configuration determined by CQC 550 and selected based on CCI 532, e.g., CCI 532 can facilitate determining candidate cluster configurations and can further facilitate selecting a preferred candidate cluster configuration of the candidate cluster configurations, which can result in CPI 522 that can be employed to actually provision a storage cluster that comports with the preferentially selected candidate cluster configuration.

System 500 can comprise criteria input component (CIC) 530 that can receive client criteria input(s) (CCI) 532. CCI 532 can embody client selected storage cluster criteria. CCI 532 can, in various embodiments, be received via client-side UE(s). CCI 532 can facilitate determining candidate cluster configurations, e.g., via CQC 550 based on entities determined by SOC 540 and interpolated values via AIC 560. The candidate cluster configurations can be further be ranked, sorted, ordered, etc., to facilitate selection of a preferred cluster configuration based on CCI 532, e.g., CCI 532 can comprise information relating to desired cluster performance criteria as well as other information relating to desired sorting/ranking/ordering parameters that can include selection criteria. Selection of a preferred candidate cluster configuration can result in CPC 520 communicating corresponding CPI 522, whereby CPI 522 can enable provisioning of a preferred storage cluster in accord with the candidate cluster configuration determined by CQC 550 based on entity information from SOC 540, AIC 560, and CCI 532.

Figure 6:
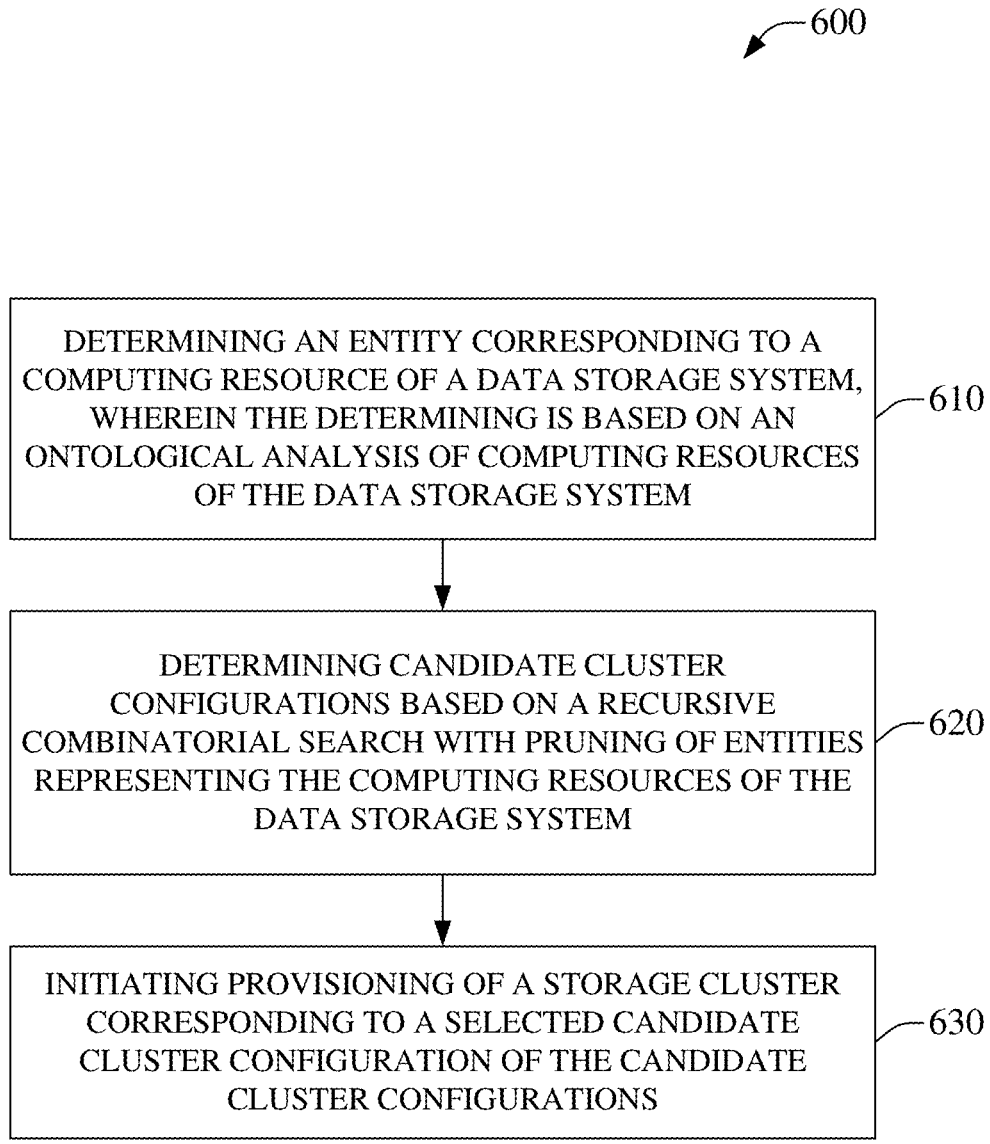
FIG. 6 is an illustration of an example method enabling storage cluster configuration, in accordance with aspects of the subject disclosure.
Figure 7:
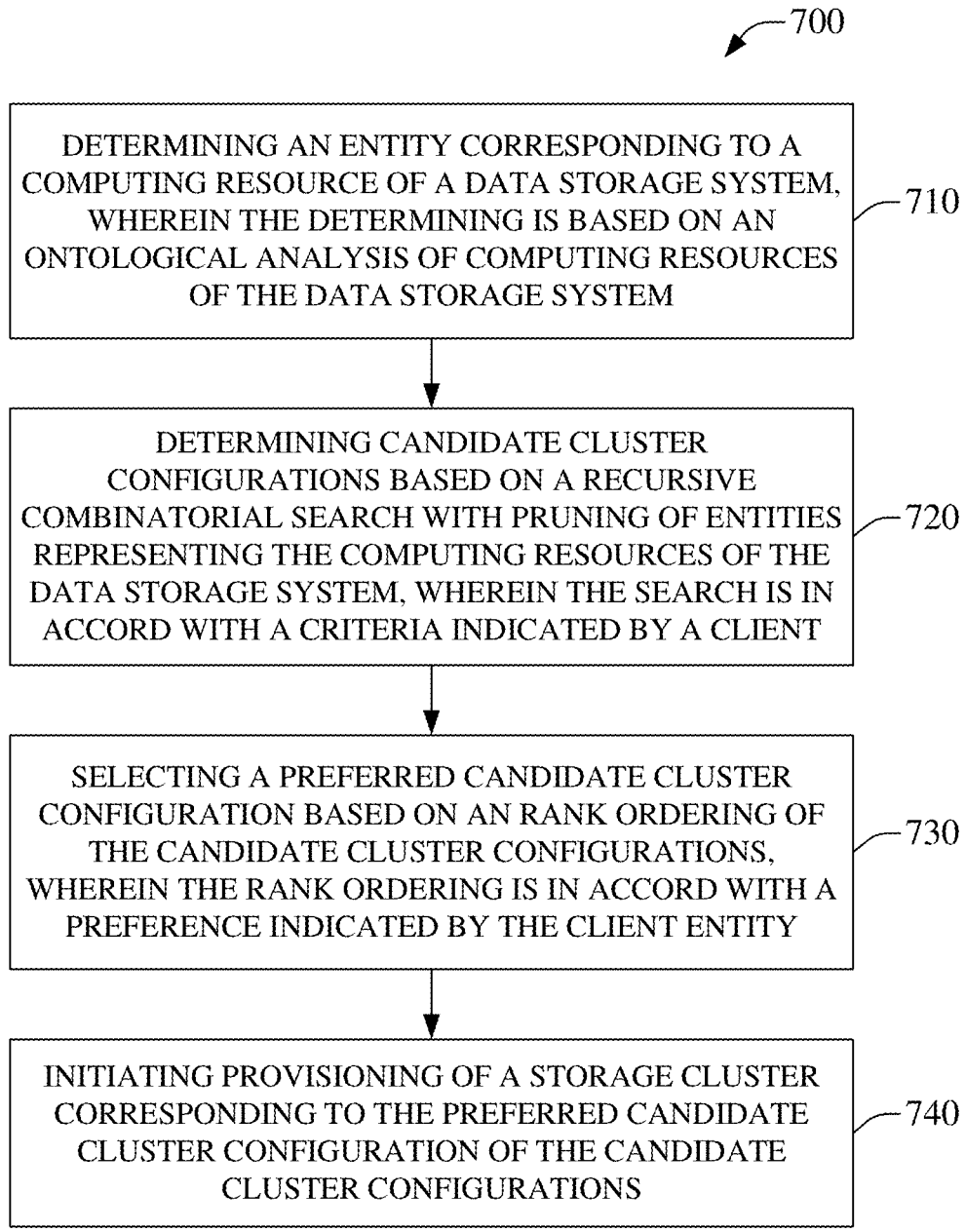
FIG. 7 is an illustration of an example method facilitating provisioning a storage cluster configuration selected based on a rank determined from a client indicated preference, in accordance with aspects of the subject disclosure.
Figure 8:
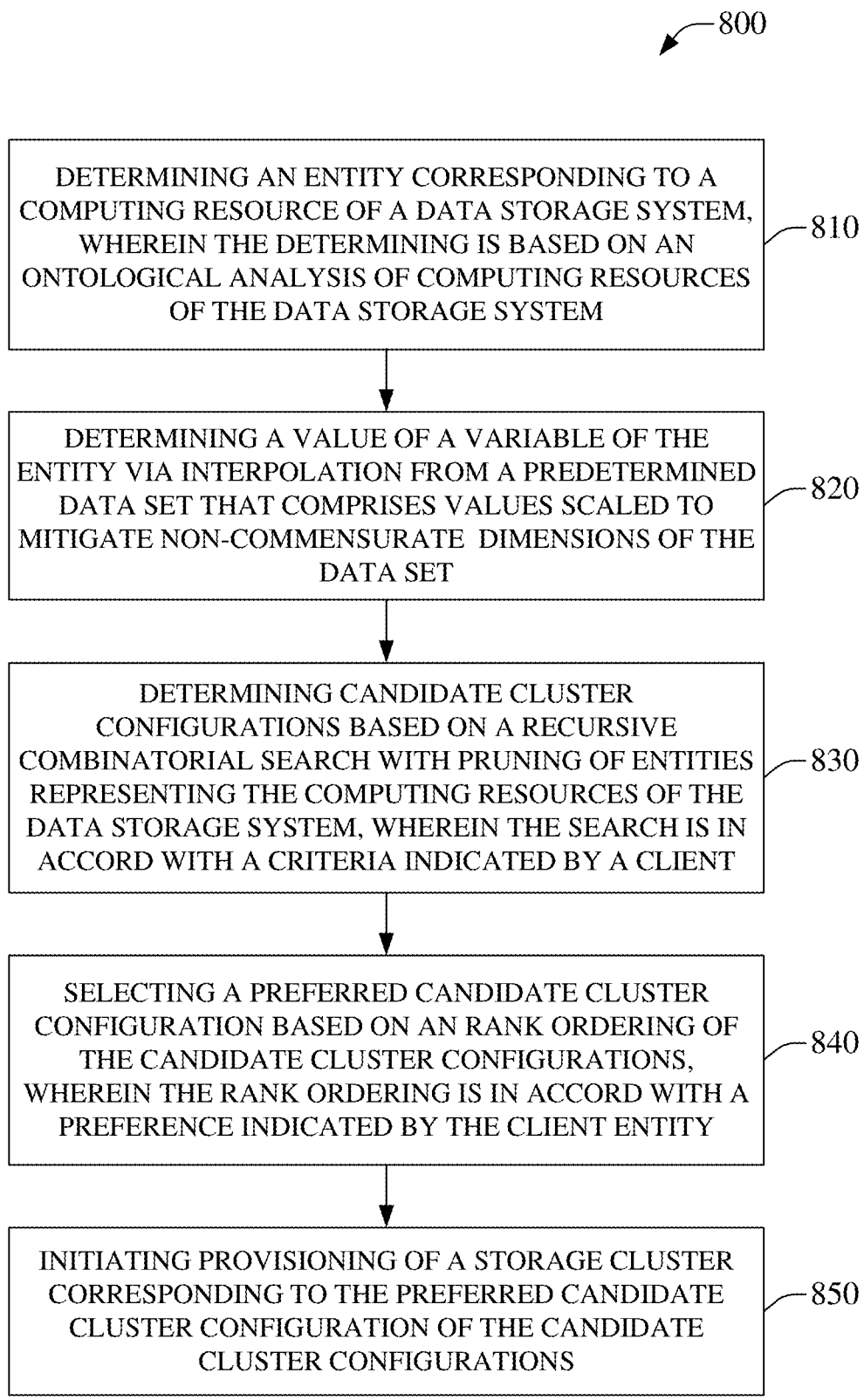
FIG. 8 is an illustration of an example method facilitating storage cluster configuration based on interpolated entity values, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600 that can facilitate storage cluster configuration, in accordance with aspects of the subject disclosure. At 610, method 600 can comprise determining an entity corresponding to a computing resource of a data storage system. The determining can be based on an ontological analysis of computing resources of the data storage system. An entity can be a named tuple of attributes that can act as a representation of a computing resource of a storage system, e.g., a node, a drive, a network component, a controller component, etc., of SSC 110, etc. An attribute can be a value associated with an entity. An attribute can be a variable value that can vary over a group of possible values. A select variable can represent a selection of a sub-entity subclass in the ontology, this can enable selecting classes of entities, e.g., selecting a node type within SSC 110. While many attributes can be freely chosen, some attributes, e.g., 'props', can be attributes that cannot be freely chosen, but rather can be determined based on an entity and state of that entity, e.g., the assignment of entity variables can result in props becoming correspondingly determined. These types of variables can be constant values, such as read throughput for a selected storage device entity, or can be algorithmically derived, for example deriving a total storage capacity of a node based on a selected count of drives in the node. Moreover, these types of variables can further comprise dynamic values, e.g., 'injects', for example a metering rate that is externally set can be an inject that is determined, e.g., injected into an entity, upon selection of a computing resource associated with the metering rate. Entities determined at 610 can therefore represent computing resources of a storage system such that combinations of entities can be analyzed to determine if they meet client cluster requirements, storage system engineering requirements, etc., which can result in a group of candidate cluster configurations.

Method 600, at 620, can comprise determining candidate cluster configurations based on a recursive combinatorial search with pruning of entities representing the computing resources of the data storage system. Entities, including the entity determined at 610, can be subjected to recursive combinatorial searching to determined candidate cluster configurations based on client indicated cluster criteria. The recursive combinatorial searching can employ pruning to winnow satisfactory candidate cluster configurations more rapidly than without pruning. Pruning can include ranking attributes via a heuristic. An attribute rank can represent a priority of a query scheduler to recurse on a node to prune the ontology based on the corresponding attribute. Early recursing on attributes that are likely to result in quick pruning of the entity search space can then be favored. As an example, ranking can be based on a simple sum of how many restrictions and constraints transitively depend on an attribute of an entity, whereby the larger the sum the earlier pruning should occur at that node due to the greater impact that can be associated with the node having a comparatively larger count of restrictions and constraints. In another example, attribute weighting values can be employed, e.g., de-weighting attributes based on their estimated expense to compute, weighting constraints, and attributes on which they depend, based on domain-specific information reflecting a corresponding constraining the search space, etc. queries can be executed according to the query schedule. A query, in some embodiments, can be executed from an unfilled root entity, with operational forks at variables, e.g., each variable value can be a node leading to a different branch. This node can support recursively searching and pruning for each corresponding branch according to the subsequent variable values along each branch. A relevant predicate of the search can be abandoned to cause the associated fork to be ignored in future recursions of a given query. Execution of the query can be accelerated, for example by placing a fork on a queue processed by a parallel group of worker processes, e.g., paralleling recursive instances of the search and prune operations. A fork that reaches the end of the schedule without being pruned can be regarded as a result of the query. Accordingly, the recursive searching of the entities according to the ontology can provide candidate cluster configurations that can be further sorted, ranked, ordered, etc., to enable selection of a preferred candidate cluster configuration.

At 630, method 600 can comprise initiating provisioning of a storage cluster corresponding to a selected candidate cluster configuration of the candidate cluster configurations. At this point, method 600 can end. In embodiments, a candidate cluster configuration of the candidate cluster configurations can be selected, e.g., as a preferred candidate cluster configuration, etc. The selection can be based on client indicated preferences, e.g., cost, speed, durability, etc., system indicated preferences, e.g., wear leveling, cost, reducing data transport, etc., or other rules, criteria, or factors. A provisioned cluster according to the selected candidate cluster configuration can satisfy client indicated criteria.

FIG. 7 is an illustration of an example method 700 that can facilitate provisioning a storage cluster configuration selected based on a rank determined from a client indicated preference, in accordance with aspects of the subject disclosure. At 710, method 700 can comprise determining an entity corresponding to a computing resource of a data storage system. The determining can be based on an ontological analysis of computing resources of the data storage system. An entity can be a named tuple of attributes that can act as a representation of a computing resource of a storage system. An attribute can be a value associated with an entity. Entities determined at 710 can therefore represent computing resources of a storage system such that combinations of entities can be analyzed to determine if they meet client cluster requirements, storage system engineering requirements, etc., which can result in a group of candidate cluster configurations.

Method 700, at 720, can comprise determining candidate cluster configurations based on a recursive combinatorial search with pruning of entities representing the computing resources of the data storage system. Entities, including the entity determined at 710, can be subjected to recursive combinatorial searching to determined candidate cluster configurations based on client indicated cluster criteria. The recursive combinatorial searching can employ pruning. Pruning can include ranking attributes via a heuristic, facilitating prioritizing a query scheduler, based on the corresponding attribute, to recursively prune entities of the ontology at a fork or node. Preferentially recursing on attributes that are more likely than other attributes to result in pruning of larger portions of the entity search space can typically more quickly reduce the number of entities being searched.

As an example, a criteria that indicates only entities located proximate to a client facility are acceptable can support pruning according to a location attribute of all entities. Where, in this example, the location-based pruning is performed before some other less impactful attribute of the entities of the search space, the location-based pruning can quickly reduce the remaining number of entities being considered and recursively searched through. A fork that reaches the end of the schedule without being pruned can be regarded as a result of the query. Accordingly, the recursive searching of the entities according to the ontology can provide candidate cluster configurations that can be further sorted, ranked, ordered, etc., to enable selection of a preferred candidate cluster configuration.

At 730, method 700 can comprise selecting a preferred candidate cluster configuration based on a rank ordering of the candidate cluster configurations, wherein the rank ordering is in accord with a preference indicated by the client entity. It is noted that the results of the search and pruning of the entity space in 720 can result in candidate cluster configurations, typically many candidate cluster configurations. As an example, if a client cluster request is rather generic, huge numbers of computing resource combinations can be satisfactory, e.g., there can be huge counts of acceptable candidate cluster configurations. As such, selecting a preferential candidate cluster configuration can be based on ranking, ordering, sorting, etc., candidate cluster configurations generated at 720. In embodiments, the ranking, ordering, sorting, etc., generally inclusively referred to as ranking herein, can be based on client indicated preferences. As an example, a client can indicate that of satisfactory configurations, a lowest monetary cost cluster is preferred. Accordingly, in this example, the candidate cluster configurations from 720 can be ranked according to monetary cost to enable selecting a preferred candidate cluster configuration of the candidate cluster configurations. In another example, ranking can further be based on storage system or other preferences, e.g., the storage system can benefit from wear leveling such that the ranking of candidate cluster configurations from 720 can be ranked to improve wear leveling of the storage system, e.g., a preferred candidate cluster configuration can result in better wear-leveling of the storage system than selecting a less preferred candidate cluster configuration. Moreover, the example ranking can combine client and non-client preference indications, e.g., ranking can rank first by monetary cost and then by wear leveling in an example. In this example, several equally low-cost candidate cluster configurations can still yield a preferred candidate cluster configuration that can have a best wear leveling result.

Method 700, at 740, can comprise initiating provisioning of a storage cluster corresponding to the preferred candidate cluster configuration of the candidate cluster configurations. At this point, method 700 can end. A provisioned cluster according to the selected candidate cluster configuration can satisfy client indicated criteria, can satisfy client indicated criteria, non-client indicated criteria, or combinations thereof.

FIG. 8 is an illustration of an example method 800, which can enable storage cluster configuration based on interpolated entity values, in accordance with aspects of the subject disclosure. At 810, method 800 can comprise determining an entity corresponding to a computing resource of a data storage system. The determining can be based on an ontological analysis of computing resources of the data storage system. An entity can be a named tuple of attributes that can act as a representation of a computing resource of a storage system. An attribute can be a value associated with an entity. Entities determined at 810 can therefore represent computing resources of a storage system such that combinations of entities can be analyzed to determine if they meet client cluster requirements, storage system engineering requirements, etc., which can result in a group of candidate cluster configurations.

Method 800, at 820, can comprise determining a value of a variable of the entity via interpolation from a predetermined data set that comprises values scaled to mitigate non-commensurate dimensions of the data set. A dependent variable of an entity can be determined via interpolation in multidimensional data space corresponding to a predetermined set of data, e.g., using attribute values previously determined for other entities can facilitate interpolating a value for the current entity. As an example, mean time to data loss (MTTDL) can be estimated based on values from datasets generated with via a failure simulator, failure model, etc., e.g., even where the MTTDL cannot be explicitly determined, the value can be interpolated from modeled or historical failure data for similar entities. In some embodiments, machine learning can be trained to predict a value for a variable, e.g., a variable's value can be inferred via machine learning in lieu of interpolation. It is noted that data sets used for interpolation or inferences can be normalized, scaled, etc., for example, by shifting each value so that each dimension (column) has a total range of [0,1], etc. Where different dimensions are non-commensurate, normalization/scaling can facilitate their use for interpolation of variable values. As an example, ranges of network bandwidth, drive sizes, and node counts can differ by orders of magnitude depending on units used, which can cause any "distance" computed using raw values to be dominated by dimensions that tend to have large values, however normalization/scaling can mitigate this issue. In embodiments, interpolation can be based on inverse distance weighting (IDW), that can estimate a value at a particular coordinate by a weighted average of values of nearby datapoints, where each weight can be inversely proportional to a power of distance of the point from the interpolation coordinate. An exponent can determine how quickly influence of a point degrades, e.g., "falls off." It is noted that, rather than using all values in the dataset, instead nearest N points can be queried from a K-D tree for use. As such, the number of points used can be configurable, although generally the number of points defaults to 2 to the dimensionality of the data. As such, in higher dimensions, each "neighborhood" can be larger and therefore more points can be sampled. This can mathematically improve interpolative performance and can also avoid a hazard where, depending on the distance exponent used, interpolated values not in the immediate vicinity of a datapoint tend toward the global average value.

Method 800, at 830, can comprise determining candidate cluster configurations based on a recursive combinatorial search with pruning of entities representing the computing resources of the data storage system. Entities, including the entity determined at 810, can be subjected to recursive combinatorial searching to determined candidate cluster configurations based on client indicated cluster criteria. The recursive combinatorial searching can employ pruning. Pruning can include ranking attributes via a heuristic, facilitating prioritizing a query scheduler, based on the corresponding attribute, to recursively prune entities of the ontology at a fork or node. Preferentially recursing on attributes that are more likely than other attributes to result in pruning of larger portions of the entity search space can typically more quickly reduce the number of entities being searched. As an example, a criteria that indicates only entities located proximate to a client facility are acceptable can support pruning according to a location attribute of all entities. Where, in this example, the location-based pruning is performed before some other less impactful attribute of the entities of the search space, the location-based pruning can quickly reduce the remaining number of entities being considered and recursively searched through. A fork that reaches the end of the schedule without being pruned can be regarded as a result of the query. Accordingly, the recursive searching of the entities according to the ontology can provide candidate cluster configurations that can be further sorted, ranked, ordered, etc., to enable selection of a preferred candidate cluster configuration.

At 840, method 800 can comprise selecting a preferred candidate cluster configuration based on a rank ordering of the candidate cluster configurations, wherein the rank ordering is in accord with a preference indicated by the client entity. It is noted that the results of the search and pruning of the entity space in 830 can result in candidate cluster configurations, typically many candidate cluster configurations. As an example, if a client cluster request is rather generic, huge numbers of computing resource combinations can be satisfactory, e.g., there can be huge counts of acceptable candidate cluster configurations. As such, selecting a preferential candidate cluster configuration can be based on ranking, ordering, sorting, etc., candidate cluster configurations generated at 830. In embodiments, the ranking, ordering, sorting, etc., generally inclusively referred to as ranking herein, can be based on client indicated preferences. As an example, a client can indicate that of satisfactory configurations, a lowest monetary cost cluster is preferred. Accordingly, in this example, the candidate cluster configurations from 830 can be ranked according to monetary cost to enable selecting a preferred candidate cluster configuration of the candidate cluster configurations. In another example, ranking can further be based on storage system or other preferences, e.g., the storage system can benefit from wear leveling such that the ranking of candidate cluster configurations from 830 can be ranked to improve wear leveling of the storage system, e.g., a preferred candidate cluster configuration can result in better wear-leveling of the storage system than selecting a less preferred candidate cluster configuration. Moreover, the example ranking can combine client and non-client preference indications, e.g., ranking can rank first by monetary cost and then by wear leveling in an example. In this example, several equally low-cost candidate cluster configurations can still yield a preferred candidate cluster configuration that can have a best wear leveling result.

Method 800, at 850, can comprise initiating provisioning of a storage cluster corresponding to the preferred candidate cluster configuration of the candidate cluster configurations. At this point, method 800 can end. A provisioned cluster according to the selected candidate cluster configuration can satisfy client indicated criteria, can satisfy client indicated criteria, non-client indicated criteria, or combinations thereof.

Figure 9:
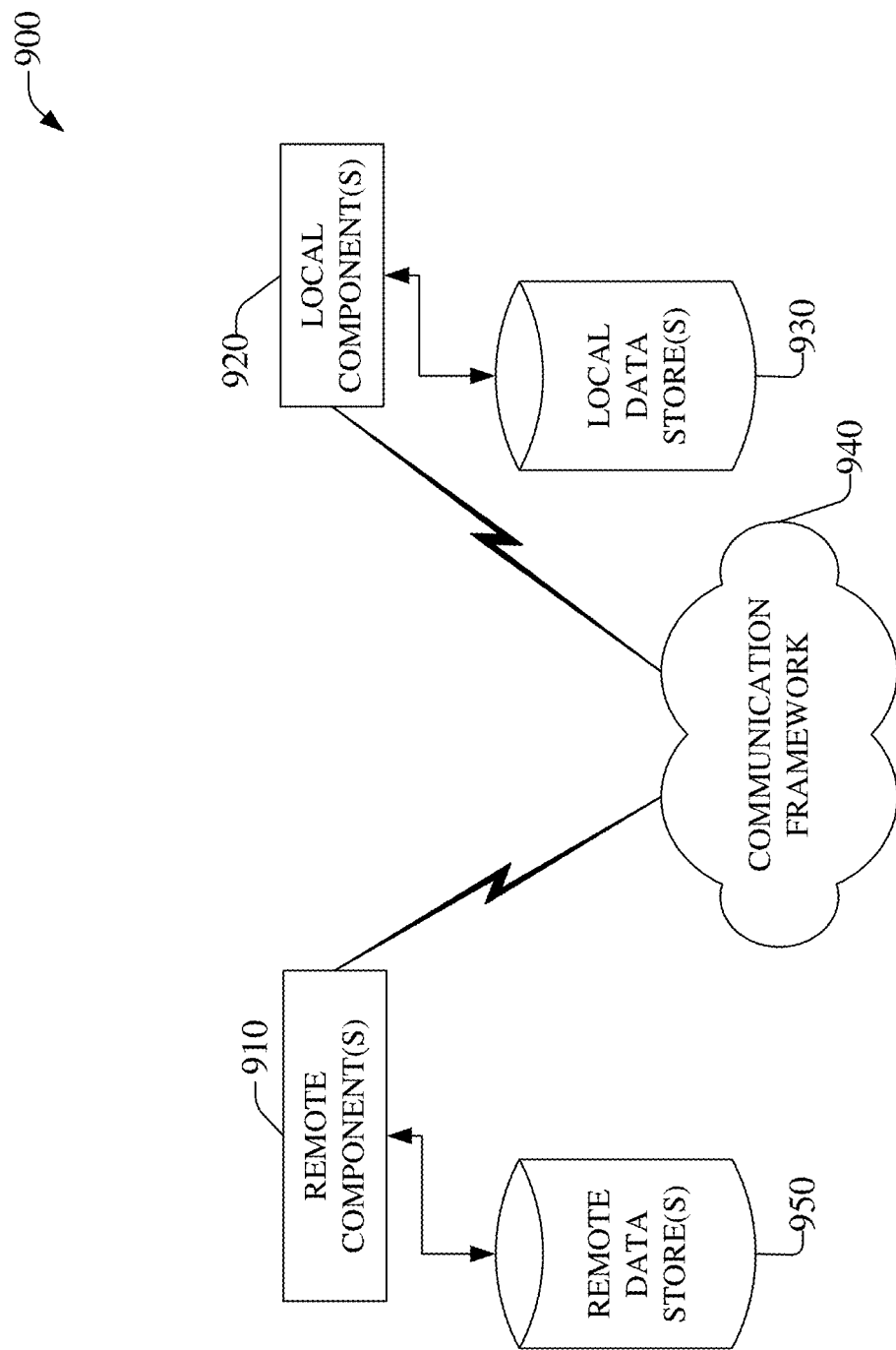
FIG. 9 depicts an example schematic block diagram of a computing environment with which the disclosed subject matter can interact.

FIG. 9 is a schematic block diagram of a computing environment 900 with which the disclosed subject matter can interact. Computing environment 900 comprises one or more remote component(s) 910. The remote component(s) 910 can be hardware and/or software (e.g., threads, processes, computing devices). In some embodiments, remote component(s) 910 can be a remotely located device comprised in storage system component 110, 210, 310, 410, 510, etc., a remotely located processor device comprised in cluster provisioning component 120, 220, 320, 420, 520, etc., a remotely located device comprised in criteria input component 130, 230, 330, 430, 530, etc., or other remotely located devices, which can be connected to a local component via communication framework 940. Communication framework 940 can comprise wired network devices, wireless network devices, mobile devices, wearable devices, radio access network devices, gateway devices, femtocell devices, servers, etc.

Computing environment 900 also comprises one or more local component(s) 920. The local component(s) 920 can be hardware and/or software (e.g., threads, processes, computing devices). In some embodiments, local component(s) 920 can comprise a local device comprised in storage system component 110, 210, 310, 410, 510, etc., a locally located processor device comprised in cluster provisioning component 120, 220, 320, 420, 520, etc., a locally located device comprised in criteria input component 130, 230, 330, 430, 530, etc., or other locally located devices.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. Computing environment 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, analyzing computing resources of SSC 110 via CPC 120 can include communicating attribute data, values, etc., between CPC 120, 220, 320, 420, and 520, and SSC 110, 210, 310, 410, and 510 correspondingly, etc.; receiving CCI 132, 232, 332, 432, and 532, etc.; communicating CPI 122-522 from CPC 120, 220, 320, 420, and 520 correspondingly to other components, etc.; can be communicated via communication framework 940 to, from, or among components of systems 100, 200, 300, 400, and 500, etc., e.g., to facilitate determining a cluster configuration, as disclosed herein.

Figure 10:
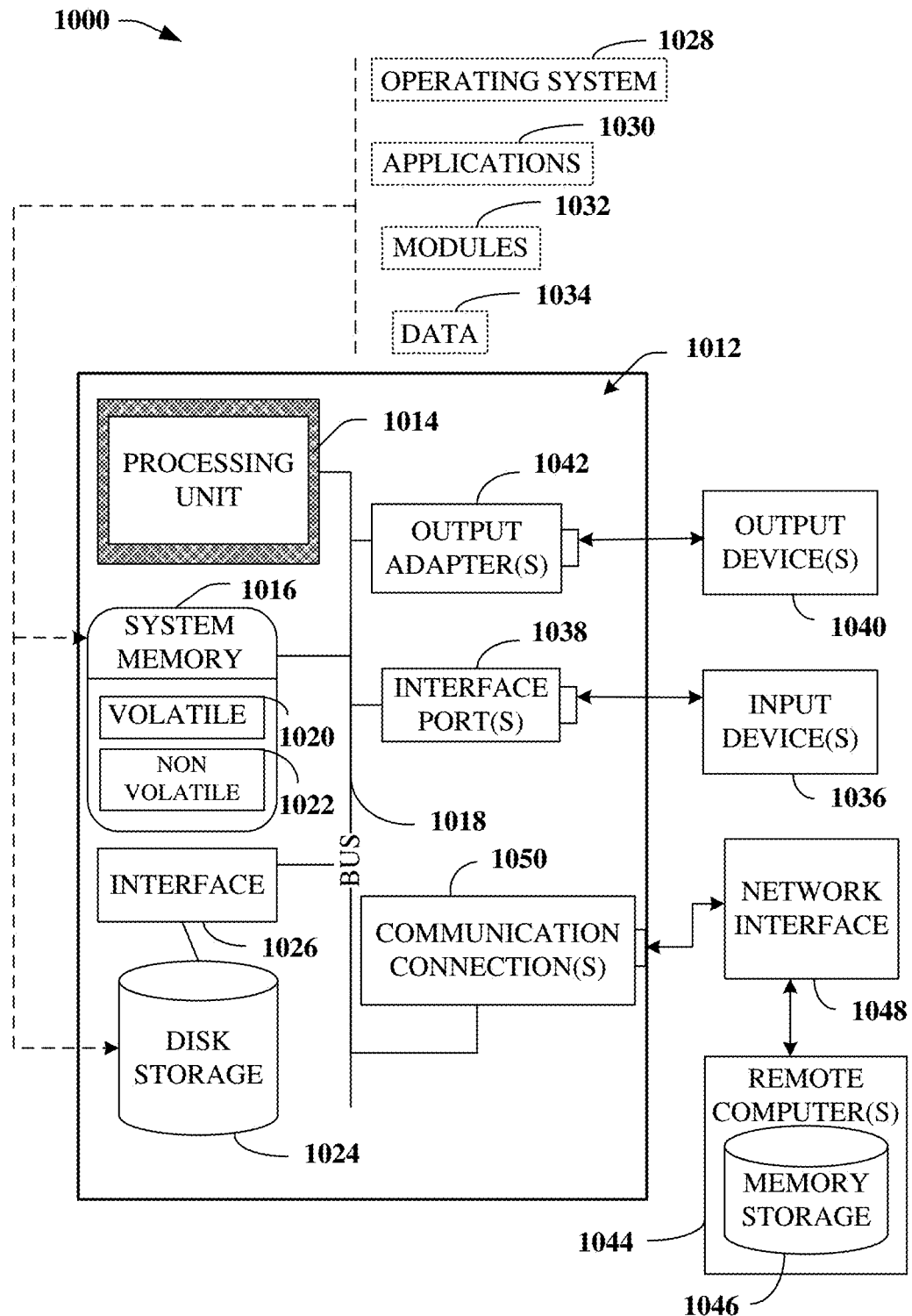
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of SSC 110, 210, 310, 410, and/or 510; CPC 120, 220, 320, 420, and/or 520; etc., can comprise a processing unit 1014, a system memory 1016, and a system bus 1018. System bus 1018 can couple system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage 1024 to system bus 1018, a removable or non-removable interface is typically used, such as interface 1026.

Computing devices typically comprise a variety of media, which can comprise computer-readable storage media or communications media, which two terms are used herein differently from one another as follows. Machine-readable storage media, which can include any computer-readable storage media, can be any available storage media that can be accessed by the machine or computer and can comprise both volatile and nonvolatile media, and removable and non-removable media. By way of example, and not limitation, machine-readable storage media can be implemented in connection with any method or technology for storage of information such as computer-readable instructions, program modules, structured data, or unstructured data. Machine-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not exclusively propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not exclusively propagating transitory signals per se. Machine-readable storage media can be accessed by one or more local or remote computing devices, e.g., via access requests, queries, or via other data retrieval protocols, for a variety of operations with respect to the information stored by the medium. As such, for example, a machine-readable medium can comprise executable instructions stored thereon that, in response to execution, can cause a system comprising a processor to perform operations comprising populating an entity search space based on attributes and an object-oriented ontology. The entity search space can comprise an entity that can be a named tuple of the attributes, and entities can correspond to computing resources of a storage system. Candidate cluster configurations can be determined based on cluster criteria and via recursive combinatorial searching of the entity search space. The recursive combinatorial search can support pruning of entity forks within the entity search space. Provisioning of a cluster can be based on a selected candidate cluster configuration of the candidate cluster configurations.

Communications media typically embody machine-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in computing system 1000. Such software comprises an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some examples of output device 1040 like monitors, speakers, and printers, among other examples of output device 1040, which use special adapters. Output adapter 1042 can comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only memory storage 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to system bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30

GHz) and infrared (IR) waves, and are sometimes referred to extremely high frequency (EHF). The wavelength (λ) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a hardware processor; and
a memory that stores executable instructions that, when executed by the processor, facilitate performance of operations, comprising:
receiving, by the system, cluster requirement data from a user account, wherein the cluster requirement data is indicative of requirements for a computing cluster to be associated with the user account;
determining, by the system, an entity corresponding to a computing resource of a storage system, wherein the entity is determined according to an object-oriented ontology, and wherein the computing resource comprises physical computer storage;
determining, by the system, a candidate cluster configuration that satisfies the requirements for the computing cluster based on a recursive combinatorial search of an entity search space comprising the entity, wherein the recursive combinatorial search supports performing iterations of pruning of entity forks of a tree structure that corresponds to the entity search space, wherein the iterations of the pruning of the entity forks result in reducing a size of the entity search space; and
provisioning, by the system, the candidate cluster configuration based on the candidate cluster configuration being determined to satisfy the requirements for the computing cluster indicated by the cluster requirement data from the user account.

2. The system of claim 1, wherein the candidate cluster configuration is ranked relative to other candidate cluster configurations determined by the recursive combinatorial search, and wherein a rank of the candidate cluster configuration is based on a selected attribute of the candidate cluster configuration.

3. The system of claim 2, wherein the selected attribute was selected based on an input received from the user account or a storage system performance characteristic.

4. The system of claim 1, wherein the entity comprises a named tuple of attributes.

5. The system of claim 1, wherein the entity is a first entity, and wherein a value of a first attribute of the first entity is determined from a second attribute of a second entity corresponding to the storage system.

6. The system of claim 1, wherein a value of an attribute of the entity is interpolated from predetermined data.

7. The system of claim 6, wherein the predetermined data is organized according to a K-dimensional tree.

8. The system of claim 7, wherein data of the K-dimensional tree is dimensionally scaled to mitigate an effect resulting from the K-dimensional tree comprising non-commensurate data dimensions.

9. The system of claim 7, wherein interpolation of the attribute is based on a weighted nearest-neighbor search of the K-dimensional tree.

10. The system of claim 9, wherein the weighted nearest-neighbor search is an inverse distance weighted nearest-neighbor search.

11. The system of claim 1, wherein the pruning is based on heuristic ordering of entity attributes at ontological forks.

12. The system of claim 11, wherein the heuristic ordering for the pruning prioritizes removing larger ontological forks in earlier recursions of the recursive combinatorial search relative to removal of ontological forks that occur in non-heuristic ordering for the pruning.

13. The system of claim 1, wherein determining the candidate cluster configuration that satisfies the requirements for the computing cluster comprises:
applying a ranking, an ordering, or a sorting heuristic to generate a query schedule, wherein the query schedule indicates a recursion order and pruning operations to perform, and wherein the recursive combinatorial search is based on the query schedule.

14. A method, comprising:
receiving, by a system comprising a hardware processor, cluster requirement data from a user account, wherein the cluster requirement data is indicative of requirements for a computing cluster to be associated with the user account;
populating, by the system, an entity search space based on attributes and an object-oriented ontology, wherein entities embodied in the entity search space correspond to computing resources of a storage system, and wherein an entity of the entities comprises a named tuple of the attributes;
determining, by the system and based on a received cluster criterion, candidate cluster configurations that satisfy the requirements for the computing cluster via recursive combinatorial searching of the entity search space, wherein the recursive combinatorial search enables performing iterations of pruning of entity forks within the entity search space, and wherein the iterations of the pruning of the entity forks comprise reducing a size of the entity search space; and
provisioning, by the system, a cluster based on a candidate cluster configuration of the candidate cluster configurations satisfying the requirements for the computing cluster indicated by the cluster requirement data from the user account.

15. The method of claim 14, wherein facilitating the provisioning comprises:
selecting, by the system, the candidate cluster configuration based on ranks from ranking the candidate cluster configurations according to an attribute of the attributes, and wherein the attribute corresponds to a client entity preference indication.

16. The method of claim 14, further comprising:
interpolating, by the system, a value of an attribute of the attributes based on a weighted nearest-neighbor search of data organized according to a K-dimensional tree, the data corresponding to modeling of a portion of the storage system.

17. The method of claim 16, wherein the weighted nearest-neighbor search comprises an inverse distance weighted nearest-neighbor search.

18. A non-transitory machine-readable medium, comprising executable instructions that, when executed by a physical processor of a system, facilitate performance of operations, comprising:
receiving, by the system, cluster requirement data from a user account, wherein the cluster requirement data is indicative of requirements for a computing cluster to be associated with the user account;
populating, by the system, an entity search space based on attributes and an object-oriented ontology, wherein an entity comprises a named tuple of the attributes, and wherein entities, comprising the entity and embodied in the entity search space, correspond to computing resources of a storage system;
determining, by the system and based on a cluster criterion, candidate cluster configurations that satisfy the requirements for the computing cluster via recursive combinatorial searching of the entity search space, wherein the recursive combinatorial search supports performing iterations of pruning of entity forks within the entity search space, wherein the iterations of the pruning of the entity forks result in reducing a size of the entity search space; and
in response to selecting a candidate cluster configuration of the candidate cluster configurations, resulting in a selected candidate cluster configuration, provisioning, by the system, a cluster based on the selected candidate cluster configuration satisfying the requirements for the computing cluster indicated by the cluster requirement data from the user account.

19. The non-transitory machine-readable medium of claim 18, wherein a value of an attribute of the entity is interpolated from a weighted nearest-neighbor search of predetermined data organized according to a K-dimensional tree.

20. The non-transitory machine-readable medium of claim 18, wherein selecting the selected candidate cluster configuration is based on an ordering of selected candidate cluster configurations according to an attribute corresponding to a client entity input value.

\* \* \* \* \*